(12) United States Patent
Cervin et al.

(10) Patent No.: US 9,152,860 B2
(45) Date of Patent: Oct. 6, 2015

(54) METHODS AND APPARATUS FOR CAPTURING, PROCESSING, TRAINING, AND DETECTING PATTERNS USING PATTERN RECOGNITION CLASSIFIERS

(71) Applicant: Tantrum Street LLC, Dallas, TX (US)

(72) Inventors: William Bennett Cervin, Dallas, TX (US); Alexander Scott Leverington, Dallas, TX (US); Kevin Michael Craft, Dallas, TX (US)

(73) Assignee: Tantrum Street LLC, Dallas, TX (US)

( * ) Notice: Subject to any disclaimer, the term of this patent is extended or adjusted under 35 U.S.C. 154(b) by 301 days.

(21) Appl. No.: 13/910,637

(22) Filed: Jun. 5, 2013

(65) Prior Publication Data

US 2014/0334721 A1 Nov. 13, 2014

Related U.S. Application Data

(60) Provisional application No. 61/821,999, filed on May 10, 2013.

(51) Int. Cl.
*G06K 9/00* (2006.01)
*G06K 9/66* (2006.01)

(52) U.S. Cl.
CPC .............. *G06K 9/00483* (2013.01); *G06K 9/66* (2013.01)

(58) Field of Classification Search
CPC ... G06K 9/00483; G06K 9/66; G06K 9/6814; G06K 15/1822; G06K 9/00456; G06K 9/00463; G06K 2209/15; G06K 9/00469; G06K 9/00818; G06K 9/325; G06F 17/212; G06F 17/218; G06T 7/0004
See application file for complete search history.

(56) References Cited

U.S. PATENT DOCUMENTS

| | | | |
|---|---|---|---|
| 7,450,760 B2 | 11/2008 | Molnar et al. | |
| 7,639,875 B2 | 12/2009 | Molnar et al. | |
| 7,640,037 B2 | 12/2009 | Mutz et al. | |
| 7,933,453 B2 | 4/2011 | Molnar et al. | |
| 2006/0114485 A1* | 6/2006 | Sato | 358/1.13 |
| 2006/0294460 A1* | 12/2006 | Chao et al. | 715/520 |
| 2008/0174815 A1* | 7/2008 | Komaki | 358/1.15 |
| 2010/0008535 A1 | 1/2010 | Abulafia et al. | |
| 2012/0143760 A1 | 6/2012 | Abulafia et al. | |
| 2012/0284185 A1 | 11/2012 | Mettler et al. | |

* cited by examiner

*Primary Examiner* — Edward Park
(74) *Attorney, Agent, or Firm* — Norton Rose Fulbright US LLP

(57) ABSTRACT

A system, methods, and apparatus for generating pattern recognition classifiers are disclosed. An example method includes identifying graphical objects within an image of a card object, for each identified graphical object: i) creating a bounding region encompassing the graphical object such that a border of the bounding region is located at a predetermined distance from segments of the graphical object, ii) determining pixels within the bounding region that correspond to the graphical object, iii) determining an origin of the graphical object based on an origin rule, iv) determining a text coordinate relative to the origin for each determined pixel, and v) determining a statistical probability that features are present within the graphical object, each of the features including at least one pixel having text coordinates and for each graphical object type, combining the statistical probabilities for each of the features of the identified graphical objects into a classifier data structure.

28 Claims, 12 Drawing Sheets

| 702 | A | F1: (4,8), (0,0), (-3,8): 95% | F2: (3,0), (3,4), (3,8): 3% | F3: (3,2), (0,0), (-3,2): 5% |
|---|---|---|---|---|
| 704 | B | F1: (4,8), (0,0), (-3,8): 15% | F2: (3,0), (3,4), (3,8): 98% | F3: (3,2), (0,0), (-3,2): 1% |
| 706 | C | F1: (4,8), (0,0), (-3,8): 4% | F2: (3,0), (3,4), (3,8): 20% | F3: (3,2), (0,0), (-3,2): 85% |

METHODS AND APPARATUS FOR CAPTURING, PROCESSING, TRAINING, AND DETECTING PATTERNS USING PATTERN RECOGNITION CLASSIFIERS

PRIORITY CLAIM

The present application claims priority to and the benefit of U.S. Provisional Patent Application No. 61/821,999, filed on May 10, 2013, the entirety of which is incorporated herein by reference.

BACKGROUND

The use of smartphones today is almost as prevalent as the use of credit cards. However, despite the widespread use of both, merchants, application developers, and hardware developers have been unable to achieve a popular integration of credit card payments with smartphones. For example, some merchants have begun using magnetic credit card readers. These readers are connectable to a data interface of a smartphone (e.g., Universal Serial Bus ("USB"), Bluetooth, headphone port, etc.) and are configured to read a magnetic strip of a credit card. While somewhat popular, a merchant is required to purchase these credit card readers and wait several days or weeks for arrival in the mail. Moreover, these credit card readers are only useful to the extent the merchant is physically present. Most consumers do not possess magnetic credit card readers to make online purchases.

Other hardware developers are attempting to market the use of Near Field Communication ("NFC") for merchant transactions. This technology requires that the merchant provide an NFC reader (e.g., a NFC enabled smartphone and a separate NFC payment terminal). This technology also requires that consumers have provisioned NFC smartphones or NFC-enabled credit cards. A current issue with this technology is that many credit cards and smartphones are not NFC compliant, at least not in the United States. Moreover, similar to the issues with magnetic readers, NFC payment systems require that the merchant have separate hardware and be physically present. Moreover, NFC cannot be used to make online payments.

Software developers have recently developed optical credit card applications that can be used with many online storefronts. These optical credit card apps record a picture of a credit card and use optical character recognition ("OCR") algorithms to determine the characters on the card. These algorithms populate the detected characters into the relevant payment fields. Many of these known OCR algorithms are configured to perform dictionary-based pattern recognition to identify characters. For example, current OCR algorithms use pattern recognition to determine character types from scanned images. These OCR algorithms may also determine the character based on previous determined characters (e.g., an 'h' is more likely to follow a 't' rather than a 'f'). Moreover, these OCR algorithms may determine characters by analyzing entire words or phrases.

While successful in some contexts, known optical credit card apps are relatively ineffective under varying lighting conditions and character fonts. Further, these optical credit card apps oftentimes require that a consumer align the card a certain distance and orientation from a smartphone's camera. Otherwise, the sizing of the scanned characters is not compatible with the algorithm's matching routines, which require relatively consistent character sizing.

Another common issue among these known OCR algorithms is that the character matching is relatively inefficient because the algorithms are configured to determine a scanned character among all character types. In other words, the OCR algorithms perform character matching by accessing one data structure that includes definitions for all characters. Further, known OCR algorithms are only configured to determine characters and cannot be used to determine graphical elements including logos, trademarks, figures, pictures, etc. A need accordingly exists for an optical pattern recognition system that creates separate definitions for each character or graphical object type based on comprehensive training algorithms that analyze many different samples under disparate conditions.

SUMMARY

The present disclosure provides a new and innovative system, methods, and apparatus for generating pattern recognition (e.g., graphical object or character) classifiers to identify, for example, credit card characters and pictures. A training server records images (e.g., samples) of a plurality of card objects under varying lighting and environmental conditions. For each of the samples, the training server determines individual graphical objects (e.g., letters, numbers, symbols, portions of figures or pictures, etc.) and creates a respective bounding region for each graphical object. The training server also determines pixels that correspond to each graphical object, identifies one of the pixels as an origin for each graphical object, and determines coordinates of the other pixels of each graphical object and the bounding region relative to the origin. The training server also determines the graphical object type of each graphical object and calculates a probability of features being present (or not present) for each of the sampled graphical objects. A combination of probabilities of the same features for the same graphical object type are used by the training server to create a classifier data structure, which is used by a pattern recognition algorithm to determine, for example, optically recorded credit card graphical objects.

In an example, a method to generate graphical object classifier files (e.g., data structures) includes identifying graphical objects within an image of a card object. For each identified graphical object within the image, the example method i) creates a bounding region encompassing the graphical object such that a border of the bounding region is located at a predetermined distance from segments of the graphical object, ii) determines pixels within the bounding region that correspond to the graphical object, iii) determines an origin of the graphical object based on at least one origin rule, iv) determines a text coordinate relative to the origin for each determined pixel, and v) determines a statistical probability that features are present within the graphical object, each of the features including at least one pixel having text coordinates. The method further includes for each graphical object type, compiling the statistical probabilities for each of the features of the identified graphical objects into a classifier data structure.

A method and apparatus for performing object detection, and recursively object-on-object detection, which comprises of a plurality of apparatuses consisting of an image capture apparatus, a pattern recognition apparatus, a pattern learning apparatus, and object detection apparatus, whereby, an object is defined by a plurality of machine recognizable features, and, whereby an apparatus is under software control, and whereby an apparatus is implemented using hardware or implemented in software. Each apparatus may consist of a single microprocessor or a plurality of microprocessors, and whereby each apparatus operates based upon the structure and data contained within the processed information. Each apparatus can be instructed to control another apparatus by way of communication through a microprocessor.

Additional features and advantages of the disclosed system, methods, and apparatus are described in, and will be apparent from, the following Detailed Description and the Figures.

DETAILED DESCRIPTION

Figure 1:
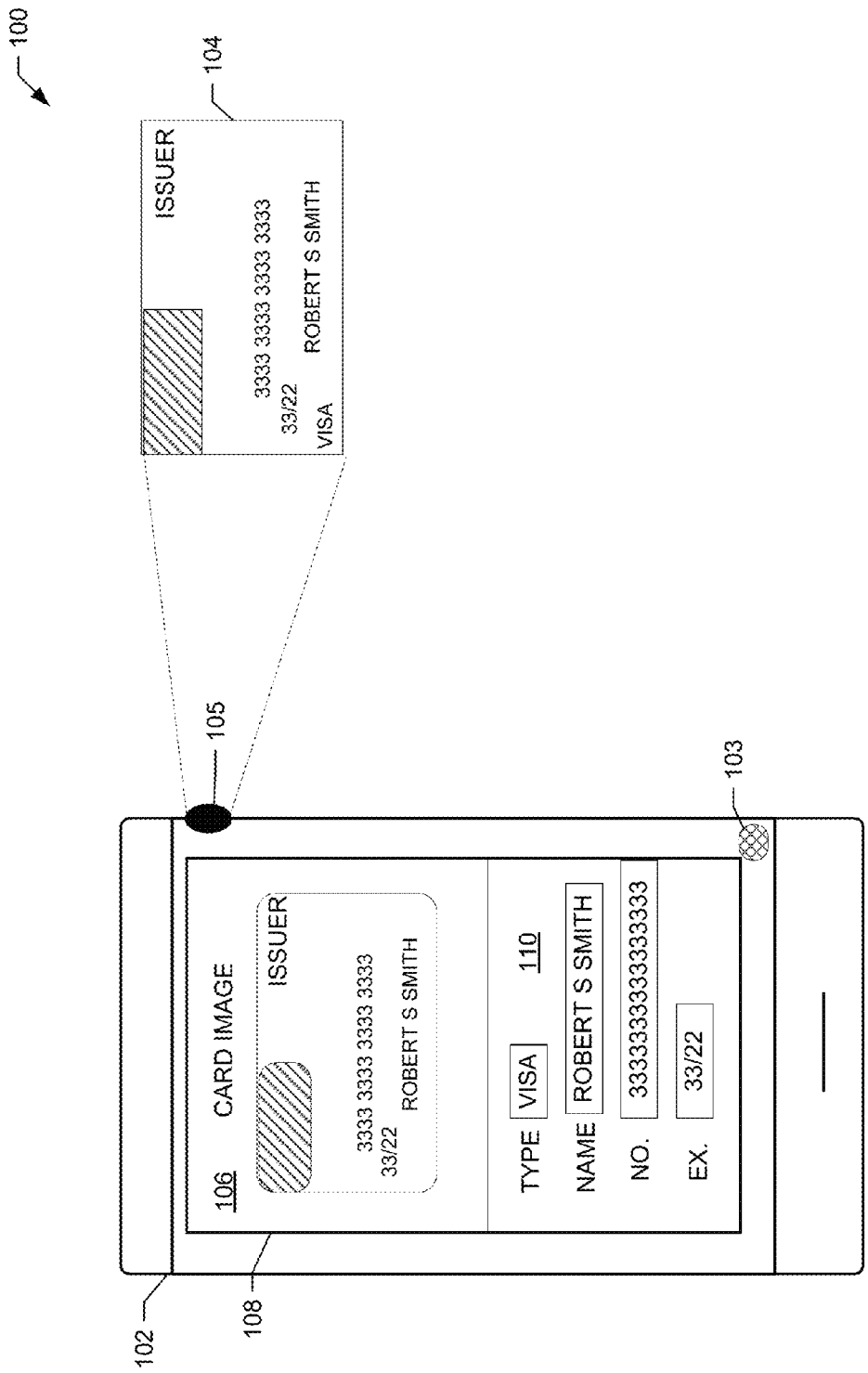
FIG. 1 shows a diagram of a payment environment in which the example methods, apparatus, and system are used

The present disclosure relates in general to a method, system, and apparatus to provide graphical object recognition, and in particular, to creating pattern recognition classifiers. Throughout the following disclosure, reference is made to characters, patterns, figures, or any other graphical representations on card objects. A card object includes a physical object that is printed, embedded, or otherwise marked with characters and other graphical objects, which are used configured to convey information to a recipient. The graphical objects can include text characters, brand identification, personal identification numbers, or pictures. The card object may also be configured to convey information magnetically (or otherwise electrically) to provide payment or identification information.

While the disclosure uses credit cards in examples, the method, system, and apparatus discussed herein can be used in conjunction with any type of card object including, but not limited to a credit card, a debit card, a gift card, a pre-paid debit card, a loyalty card, a membership card, a driver's license, an insurance card, a medical card, a prescription card, a club card, an affinity card, a bank check, a business card, and/or a logo. In addition, the method, system, and apparatus discussed herein may be applied to other objects including, for example, vehicle silhouettes, vehicle license plates, airplane fuselages, and/or non-bounded information sources (e.g., information on a display or paper where a boundary is not readily apparent).

As mentioned, each card object includes a plurality of characters and graphical objects. The characters indicate, for example, a name, a card identifier number, an expiration date, an issuer, a security code, etc. These characters can include any letter, number, symbol, etc. that is marked, printed, or otherwise imprinted onto a card object. Oftentimes, characters are separated by spaces (e.g., areas of a card object that do not include characters, graphics, etc.). However, in some instances characters may be connected (e.g., cursive characters).

Graphical object can include any graphical feature printed and/or embedded within a card object including characters. For example, graphical objects include at least a portion of logos, pictures, figures, drawings, etc. For example, a picture of an individual on a driver's license may be partitioned into one or more graphical objects corresponding to facial features, hair, facial shape, piercings, clothing, etc. The method, apparatus, and system disclosed herein compares features of each graphical object to features within classifier data structures to accordingly identify the pictured graphical element.

Graphical object type refers herein to a label of a particular graphical object. Each letter of the alphabet, each numeral, each symbol, each element of a picture is a different graphical object type. For instance, the character (letter) 'A' is of the character type 'A'. The disclosure distinguishes graphical object from graphical object type because a purpose of the disclosed graphical object detection algorithm is to determine which graphical object types correspond to imaged graphical objects printed on a card object or provided in non-bounded information. In other words, the trained classifier data structures are used to determine which graphical object type corresponds to a group of line segments that form an imaged graphical object.

As disclosed herein, a feature may include a line, connected lines, or a curve. A feature may also include derived lines and curves (e.g., features). As disclosed herein, derived lines and curves are based on a histogram or other frequency-domain representation of pixels that is referenced to an origin pixel. Derived lines/curves are created by applying an algorithm to sample and/or transform pixels of a given region of a graphical object. This can include, for example, determining an average color of a region or creating a graph of a distribution of color in a region. As disclosed herein, the methods, system, and apparatus use derived pixel data to statically evaluate the likelihood that a group of pixels in a graphical object corresponds features in classifier data structures. The methods, system, and apparatus may also use a convolution to derive lines and/or curves.

Reference is also made herein to classifier data structures, which may be Extensible Markup Language ("XML") files or any other common file format. A classifier data structure is created for each graphical object type and includes a probability that a feature is present (or not present) for that graphical object type. The classifier data structure also includes a definition of each feature (e.g., coordinates of pixels included within the feature). As disclosed herein, a feature is a combination of pixels (or derived combination of pixels) that form a line segment, two line segments connected at an angle, a curved line segment, or any other pattern that defines at least a portion of a graphical object.

As disclosed herein, classifier data structures (and a corresponding graphical object recognition algorithm) are transmitted to smartphones (e.g., client devices) to be used in conjunction with applications and websites that include an online payment feature. The classifier data structures may also be used in the initial provisioning by a client device of a physical card object into its digital proxy form. During use, a client device analyzes live video streams and/or recorded images of a card object and executes a graphical object recognition algorithm, which compares each imaged graphical object separately to each classifier data structure. Thus, for each imaged graphical object in a system with 52 different graphical object types, the algorithm will receive 52 answers as to whether there is a match. In many circumstances, there will be 51 negative answers and 1 positive answer. The algorithm determines the graphical object type of the imaged graphical object based on the corresponding classifier data structure with the positive answer.

The disclosed graphical object recognition algorithm uses frequency analysis and dynamic priority queuing to operate faster than the n/2 traditional search metric (where n is the number of classifier data structures). The frequency analysis and dynamic priority queuing places the most frequently identified classifier data structures at the front of the search queue in real-time. In alternative embodiments, the graphical object recognition algorithm may process classifier data structures in two or more parallel processing paths using frequency analysis and dynamic priority queuing to further reduce processing time.

Graphical Object Processing

Modern known processors have standardized 32 or 64 bit operations. These processors are often limited to operating on binary representations of data. However, the processors may use parallelization to increase throughput and additional commands to aggregate multiple binary operators. Despite this, the processors are still cyclically limited by memory bandwidth, CPU operating frequency, and/or the frequency by which the CPU operates on memory.

Since the beginning of transistor-based computing, microprocessors still perform operations on information in binary form, and that information is made available to the CPU in sets of bits that are counted in powers of 2. As technology has gone from 8, to 16, to 32, and now 64-bit processors, the obvious next step will be 128-bit processors. There is even already a form of 128-bit (or greater) emulation through Single Instruction Multiple Data ("SIMD") instructions and stream processing. This fundamental design of modern microprocessors has a significant (and often deleterious effect) on an ability of a developer to translate mathematical algorithms into a form that can efficiently, consistently, and integrally, be carried out by a set of instructions provided to a microprocessor. Thus, the structure, form, and order in which instructions are executed by a microprocessor are crucial for acceptably performing complex operations in a time sensitive environment. Image processing, pattern recognition, and object detection all include complex algorithms involving numerous fields of science. More importantly, there are additional fields of science dedicated to implementing these complex algorithms with software controlled microprocessors. Accordingly, modern microprocessors, such as a CPU, are implemented in conjunction with accelerated processing units such as a graphics processing unit ("GPU"), digital signal processor ("DSP"), field-programmable gate array ("FPGA"), or any other microprocessor specifically designed to accelerate one or more types of computations. Still, as is commonly accepted, all of these microprocessors operate on information in binary form.

Image processing, pattern recognition, and pattern detection implement math formulas and algorithms to produce a quantifiable result from provided information. For example, the algorithms can infer or derive numbers of a license plate, a suspect based on a fingerprint, or a probable outcome of an event. These algorithms, when developed in information form such as mathematical formulas, often represent an infinite number of states or possibilities. However, when implemented in a form which can be processed by a computer, the representation of a particular state (or the possibility of a particular state) can usually only be represented in a limited form. For example, a mathematical expression includes: [(infinity−1)*x=(infinity−1)*y]. A human can immediately interpret these symbols, and through basic algebra, infer that x and y are the same number. In contrast, representing this information in a form which can be processed by a microprocessor is undefined and a set of processes and methods must be created in order to instruct the microprocessor to solve a similar problem. Principally, a processor is capable of performing elementary arithmetic and can only do so efficiently with integers which are smaller than 2 to the power of x, where x is the number of bits capable of operating on by the processor. Thus, an 8-bit processor can operate on numbers up to 256 and a 32-bit processor can operate on numbers up to 4294967296. As such, and in addition to the previously described issue of representing a given mathematical expression, a developer must also represent information in a form, often through the use of software or hardware, by which the microprocessor can operate on numbers outside of its innate capacity.

Thus, provided with a process that is configured to be controlled by a microprocessor, there exists an issue of optimally representing information such as mathematical expressions and numerical information. This issue is also encountered when implementing systems that perform image processing, pattern recognition, and pattern detection. Known data processing techniques, including but not limited to, machine learning, pattern recognition, compiler optimizations, and feature classification procedures often are applied to address this issue.

However, known image processing and object detection methods have issues processing outlier graphical objects. These known methods do not have a method for defining, storing, or communicating normalization of trained images. These known methods also lack of means for storing and retrieving information used to exclude or otherwise prevent outliers or noise from negatively impacting training. These known methods further lack of means for storing and retrieving information used to improve classifier accuracy. For instance, current bayes, k-nearest neighbor, and neural network methods are configured based on images of polyhedra objects and noise created by extensive hard edges.

Additionally, current known training and detection systems have issues regarding how trained objects are extracted. For example, known training and detection systems extract images, in whole form and a ruled surface such as a cylinder, polyhedra, or prism. In practice, these include faces, cars, human bodies, etc. However, a character embossed on a credit card, a logo printed onto a gift card, or a specific key on a keyboard are objects found upon another object and are difficult to extract and train using known systems. Accordingly, the disclosed system facilitates the training and accurate detection of these graphical objects without extracting or considering the background.

Further, known systems require a graphical object to be extracted and removed from their background. In contrast to these known systems, the disclosed method, system, and apparatus eliminate this requirement through normalization, data modeling, and image processing operations. Current known processes are subject to outliers (e.g., Haar wavelet) and are not accurate when trained without extracting objects from their background. This training is accomplished by modeling real-world dimensions of an object and using the resulting data structure to limit/constrict/filter (e.g., mask) training operations. This training may also be applied to detection and can optionally be used to optimize, filter, or introduce metrics to a detection process to increase accuracy.

In an example of a known method, a processor is configured to train and detect surface contents of a gift card. The processor uses a current known Haar wavelet process to 'learn' the shape of the gift card. However, the shape of the gift card is not an accurate model for determining the surface of the gift card. This discrepancy results in a false positive because the edges and shape of the card itself will be classified as an equally significant and recognizable portion of the object as the contents of the surface of the card. Thus, another card or object similarly shaped to the card itself, along with very little noise, will result in false detection. With this known Haar (or similar) process, the background shape of the card must be extracted from the card itself, thereby making the card the background.

In contrast, the methods, apparatus, and system disclosed herein enable training of surface content of the card without any background extraction. The benefit of this is twofold; the training process requires less human supervision and the accuracy of detection is improved. The example methods, apparatus, and system disclosed herein also facilitate and/or operate supervised or unsupervised learning. Accordingly, graphical objects used for training can be categorized by a human or inferred based on a variety of methods (means difference, motion analysis, structure analysis, etc.). The methods, apparatus, and system disclosed herein may also model real-world dimensions of objects (e.g., card objects), which are used for training and making classifier data structures available to a graphical object recognition algorithm. The classifier data structures may include any information (e.g., features) used to recreate or model a real-world object, such as for example, polygons, histogram, lines, tesseracts, point clouds, support vector machines ("SVMs"), textures, ratios, markov models, etc.

With regard to units of information to be altered or evaluated by a microprocessor, and thus being represented as a series of bits, it is therefore desirable to provide a method and apparatus for storing and retrieving information such that a microprocessor or a plurality of microprocessors may be applied, separately or in concert, to the issues of learning patterns, recognizing patterns, classifying patterns and features within an image, and recognizing an object or plurality of objects within an image. It is further desirable that this apparatus store and retrieve data structures in a machine readable form which represents an image, a single or plurality of features, a single reference or plurality of references to classification procedures, and/or a single reference or a plurality of references to data structures representing information which describes a tangible or intangible object.

As disclosed herein, the recording of graphical objects may be stored in a spatial form (pixel coordinates), a statistical probability form, a waveform, or any data structure that can be derived from a graphical object or evaluated against another graphical object. The example methods, apparatus, and system disclosed herein encapsulate the storage of this data and model spatially relevant object dimensions. For example, a credit card object is 8.5 mm by 5.4 mm and the features of a character found on that card are expected to be proportionally sized. Overall, the encapsulation and routing of these characters throughout the sample-capturing, training, and detection process is unique to known systems. Also unique to known systems is the evaluation of sampled information in aggregate to predict or determine the next branch in the detection process.

Example Payment Environment

FIG. 1 shows a diagram of a payment environment 100 in which the example methods, apparatus, and system are used. The payment environment includes a client device 102 (e.g., a smartphone, tablet computer, laptop, personal computer, etc.) that includes a graphical object recognition algorithm 103. It should be appreciated that the algorithm 103 may either be installed onto the client device 102 by a user (e.g., via an app store) and/or may be preinstalled onto the device at manufacture.

The example payment environment 100 also includes a card object 104 (e.g., a credit card). The card object 104 includes graphical objects or characters that identify, for example a name, a card number, an expiration date, and an issuer of an account. In other examples, the card object 104 can also identify a security code, financial institution brander, a quick response code, etc.

As disclosed herein, the graphical object recognition algorithm 103 is used by the client device 102 to determine graphical objects on the card object 104 to facilitate a payment transaction. An application (e.g., an app) that includes a payment function instantiates the algorithm 103 to capture the payment information displayed on the face of the card object 104. To determine the graphical objects, the client device 102 images (either through a live video feed or still image(s) recorded by a camera 105) the card object 104. For reference to a user, the client device 102 displays the recorded image within a preview area 106 of a display 108.

After recording the image of the card object 104, the client device 102 (or a payment app operating on the client device 102) executes the graphical object recognition algorithm 103, which analyzes the recorded image(s) for graphical objects. The analysis may be performed by creating virtual blocks over the imaged card object and determining whether a graphical object is included within the virtual block. The graphical object recognition algorithm 103 then accesses classifier data structures to determine which features of the detected imaged graphical objects most closely match the features of a particular graphical object type. The graphical object recognition algorithm 103 outputs the determined graphical objects into the appropriate fields of the payment area 110. In some instances, the graphical object recognition algorithm 103 includes instructions (or rules) that specify to which field graphical objects are populated based on where the graphical objects are located on the card object 104 and/or based on the organization of the graphical objects (e.g., strings of 16 numbers corresponding to a card number, four numbers separated by a symbol corresponding to an expiration date, etc.). At this point, a user may submit the credit card information to complete the transaction.

It should be appreciated that in other examples, the client device 102 could be used by a merchant to record credit card information. In this manner, the disclosed methods, apparatus, and system may be used by merchants for physical point-of-sale transactions and by consumers for online purchases. It should also be appreciated that the graphical object recognition algorithm 103 is implemented as software operating on the client device 102 and does not need a separate hardware component (other than a camera included within the device 102) to operate. Moreover, it should be appreciated that the graphical object recognition algorithm 103 efficiently determines graphical objects by using separate classifier data structures for each graphical object type.

Figure 2:
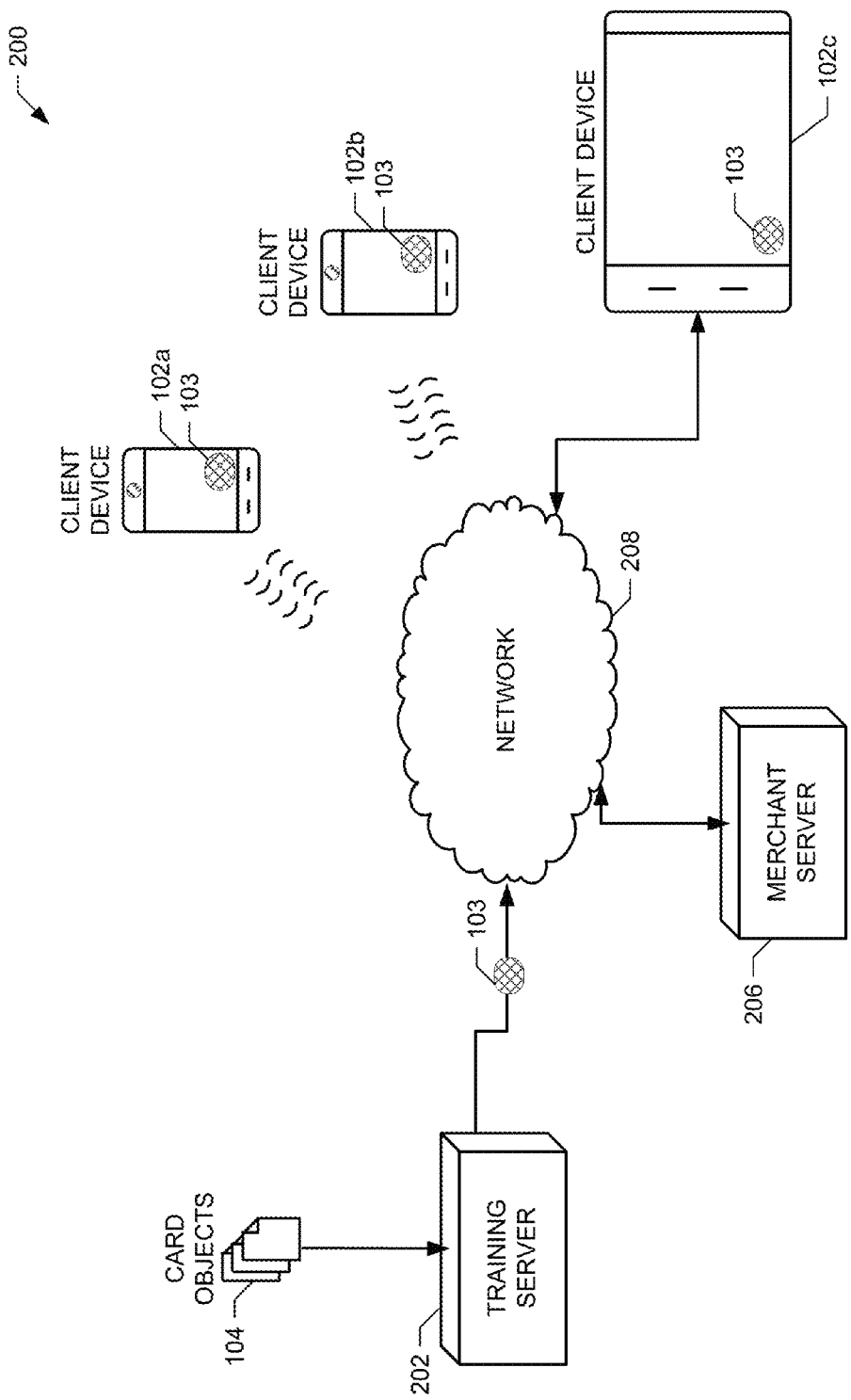
FIG. 2 shows a diagram of a transaction environment including a training server that creates classifier data structures used by client devices to determine graphical objects during payment transactions.

FIG. 2 shows a diagram of a transaction environment 200 in which classifier data structures are used by client devices to determine graphical objects during payment transactions. The illustrated environment 200 includes a training server 202, which is configured to use images (e.g., samples) of card objects 104 to generate classifier data structures for the graphical object recognition algorithm 103. While the training server 202 is shown as a single component, in other embodiments the training server 202 may include multiple servers or implemented in a cloud computing framework.

Figure 3:
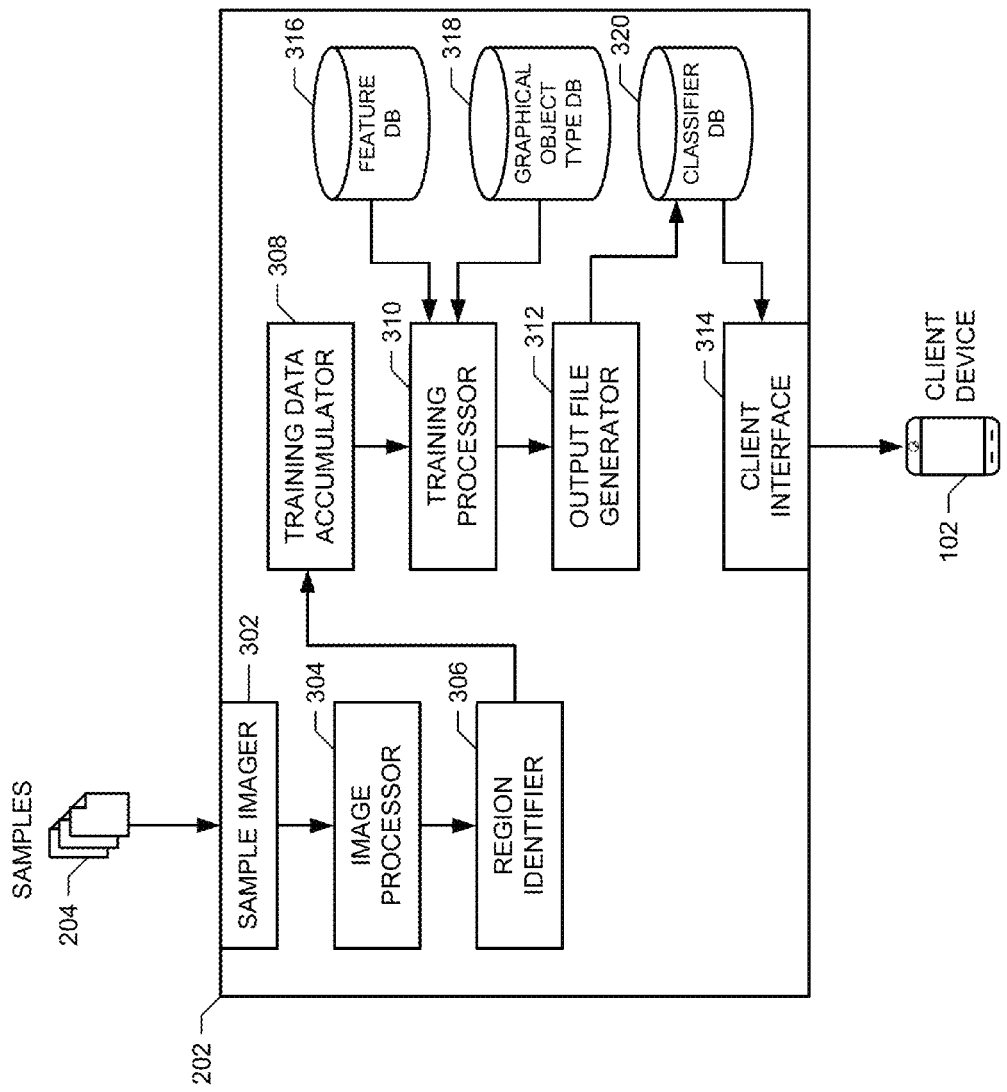
FIG. 3 shows an example functional diagram of the example training server of FIG. 2.

As described in more detail in conjunction with FIG. 3, the example training server 202 records images of the card objects 104 and processes the images to remove photographic artifacts. The example training server 202 also detects graphical objects for each sample 204 and creates a bounding region for each detected graphical object. The bounding regions are rectangular regions used by the training server 202 to determine origins and proportions of individual imaged graphical objects. By applying bounding regions, the training server 202 is able to adjust sizing of imaged samples so that the same type of graphical objects have substantially similar dimensions and origins, thereby increasing the efficiency of graphical object detection.

The training server 202 applies each bounding region such that a border is located at a predetermined distance from the edges of a portion (e.g., segments) of a graphical object. The height and width of each bounding region is accordingly based on the size of the imaged graphical object. In addition to applying bounding regions, the training server also determines pixels that correspond to the respective imaged graphical objects, determines an origin for the graphical objects, determines text coordinates for the pixels relative to the origin, and determines a statistical probability for each graphical object type that at least one feature of the graphical objects are present at a same location for that graphical object type.

As disclosed in more detail below, the graphical object feature includes a group of pixels (or information derived from a group of pixels) having text coordinates that corresponds to a segment, two line segments connected at an angle, a polygon, and/or curved line segments that comprise at least a portion of a graphical object. The graphical object feature may also include a histogram, a tesseract, a point clouds, an SVM, a texture, a ratio, and/or a markov model. For example, the 'A' character type includes a feature of a right line segment (e.g., '/') a feature of a left line segment (e.g., '\'), and a feature of a line segment between the right and left segments (e.g., '-'). Another feature could include the angle formed at the connection of the left and right segments (e.g., '◯'). Yet another feature could include a five-sided polygon.

Each feature includes coordinates of one or more pixels that are included within the feature. In some instances, the coordinates of the pixels provide a boundary for the feature. The coordinates are relative to an origin. In the example above, the training server 202 selects the upper-left most pixel of any imaged graphical object as the origin. The training server 202 then determines coordinates relative to the origin for the pixels corresponding to the ends of the left line segment as a definition of that feature. The use of pixel coordinates relative to an origin compresses the size of data structures used by the graphical object recognition algorithm 103 to determine graphical objects.

In the disclosed embodiment, the training server 202 is connected to a database that stores definitions for each feature. The training server 202 uses these definitions to determine a statistical probability that each feature is included for a particular graphical object type. In other words, the training server 202 compares each feature to each imaged graphical object sample and determines a probability that the feature is present (or not present) in the sample. The training server 202 then combines the probabilities for each graphical object type for the different imaged samples. The training server 202 stores these combined probabilities to cascading classifier data structures. Thus, each classifier data structure includes a probability that each feature is present (or not present) for the corresponding graphical object type. It should be appreciated that providing a statistical probability for all features for every graphical object type enables the graphical object recognition algorithm 103 to effectively and efficiently determine graphical objects of different sizes and fonts under varying conditions.

The example illustrated environment 200 of FIG. 2 also includes client devices 102 communicatively coupled to the training server 202 and a merchant server 206 via a network 208 (e.g., the Internet). The training server 202 is configured to provide the client devices 102 with the graphical object recognition algorithm 103 including classifier data structures. In addition, the training server 202 may transmit updated classifier data structures based on feedback or processing of additional card objects 104. In some embodiments, the client devices 102 may request for the training server 202 to provide the graphical object recognition algorithm 103 in conjunction with the classifier data structures. For instance, the graphical object recognition algorithm 103 may be provided by the training server 202 as a stand-alone and/or plug-in application.

Alternatively, the training server 202 may provide the graphical object recognition algorithm 103 and classifier data structures in conjunction with a payment application to the client devices 102. For example, a user may download an application to purchase products from a particular merchant. The graphical object recognition algorithm 103 and classifier data structures may be included within the download.

In other embodiments, the client devices 102 may be prompted to download and install the graphical object recognition algorithm 103. For instance, the client device 102a may access the merchant server 206 to purchase products. At checkout, the merchant server 206 provides an option for the client device 102a to provide credit card information by optically scanning a credit card. Responsive to the user selecting this option, the merchant server 206 causes the graphical object recognition algorithm 103 and corresponding classifier data structures to be installed on the client device 102a to complete the transaction. In some embodiments, the merchant server 206 instructs the training server 202 to provide the graphical object recognition algorithm 103. Additionally or alternatively, the merchant server 206 provides the graphical object recognition algorithm 103.

Training Server

FIG. 3 shows an example functional diagram of the training server 202 of FIG. 2. It should be appreciated that the diagram shown in FIG. 3 is only one example of implementing the training server 202, which includes a sample imager 302, an image processor, 304, a region identifier 306, a training data accumulator 308, a training processor 310, an output file generator 312, a client interface 314, a feature database 316, a graphical object type database 318, and a classifier database 320. In other embodiments the functional blocks may be combined, removed, rearranged or expanded. For instance, the training server 202 may additionally include a feedback processor and graphical object recognition algorithm manager.

The example training server 202 is configured to create graphical object recognition (e.g., pattern recognition) classifier data structures by determining a probability that certain sampled graphical object features are present (or not present) in graphical object types. The training server 202 provides the classifier data structures in conjunction with a graphical object recognition algorithm 103 to client devices. In some examples, the training server 202 may combine the classifier data structures with the graphical object recognition algorithm. In other examples, the training server 202 provides the classifier data structures as a library of files accessible by the graphical object recognition algorithm 103 to identify graphical objects.

i) Sample Imager

To record images of card objects 104, the example training server 202 of FIG. 3 includes the sample imager 302. The example sample imager 302 includes a camera component that records visual images (e.g., digital photographs) of card objects 104. The card objects 104 are provided by personnel associated with the training server 202. For example, personnel may receive (or request) card objects from different card issuers that provide these cards as samples. In other embodiments, card issuers may transmit images of card objects 104 to the same imager 302.

The sample imager 302 may include one or more cameras including, for example, video cameras, high-definition cameras, 3D-cameras, focus-shifting cameras, infrared cameras, smartphone or tablet cameras, robot cameras, vehicle cameras, desktop/laptop webcams, security cameras, etc. In many embodiments the sample imager 302 includes cameras that closely approximate (or are the same as) cameras used by client devices of consumers. Using, for example, smartphone cameras provides images of card objects 104 that are as close as possible to the images of card objects that are recorded during normal use by consumers, thereby providing relatively more effective classifier data structures for the graphical object recognition algorithm 103.

The sample imager 302 is configured to record positive images of card objects 104 in various lighting and/or environmental conditions. Each image of the card object 104 is a sample. The sample imager 302 may also apply handling marks to the card objects 104 prior to imaging. The sample imager 302 may further record images of card objects 104 under varying exposure times. The different lighting conditions, environmental conditions, and marks provide additional samples from the same card object to make classifier data structures accurate under varying real-world usage conditions.

To providing different lighting, the sample imager 302 may include (or control) different frequencies (and/or intensities) of light. For example, light could be applied that simulates lighting conditions within a retail store, a restaurant, or a night club. The sample imager 302 may also include (or control) different environmental conditions including, for example, dispensing water (to simulate rain or snow) onto a card object, applying wind to a card object, freezing the card object, heating the card object, etc. Moreover, the sample imager 302 may include (or control) sandpaper and/or knives to simulate card usage. For instance, the sample imager 302 could wear away portions of printed graphical objects and/or scratch the surface of a card object prior to recording images. The sample imager 302 may be preprogrammed to apply each condition to each sampled card object or, alternatively, may apply random conditions to different card objects.

Figure 4:
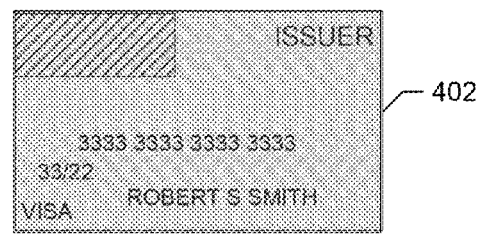
FIG. 4 shows diagram of example images recorded by the example training server of FIG. 2.
Figure 4:
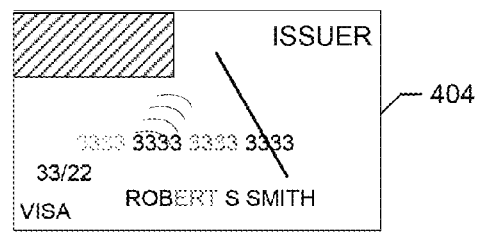

For example, FIG. 4 shows diagram of example images 402 and 404 recorded by the sample imager 302. The example image 402 is recorded after the sample imager 302 applied a relatively low intensity light to a card object 104. The example image 404 was recorded after the sample imager 302 applied physical wear marks and scratches to a card object. In particular, the sample imager 302 causes some of the card identifier numbers to become worn (e.g., lighter in appearance), applied a deep linear scratch over some numbers, and applied lighter semi-circular scratches over other numbers.

In addition to recording positive images of the card objects 104, the sample imager 302 is also configured to record negative images (e.g., backgrounds of card objects). These negative images are recorded to enable the training server 202 to create permutations between the normal positive samples and the possible backgrounds in which card objects 104 may appear. The sample imager 302 is configured to record negative images using the same lens and equipment used to record the positive samples.

ii) Image Processor

To normalize the positive images of the card objects 104, the example training server 202 includes the image processor 304. The example image processor 304 is configured to remove imaging distortions or noise that may affect graphical object detection. This includes removing (or fixing) out-of-focus images. This also includes correcting shadow effects, light bursts, skew, diffusion, etc. The normalization also includes applying image transformations to create relatively uniform image samples. The image transformations include, for example, color adjustment, bit depth adjustment, resolution adjustment, hue adjustment, saturation adjustment, etc. In other embodiments, the image processor 304 may also rotate and crop image samples.

In some instances the image processor 304 is configured to automatically normalize images to predefined visual parameters. The determination of predefined visual parameters is based on which image properties facilitate favorable graphical object identification. In other instances, personnel may manually adjust image properties to normalize the images.

iii) Region Identifier

To prepare each graphical object of each sample for analysis, the example training server 202 includes the region identifier 306. The example region identifier 306 is configured to identify graphical objects within imaged samples. To identify graphical objects, the region identifier 306 determines a color (or shade/hue) and/or contour of each pixel and compares the colors or contours to one or more rules. The rules specify, for example, which pixel colors are to be designated as graphical objects. In some embodiments, the rules may determine the graphical object pixel color at least in part on the background color of the card object 104. The region identifier 306 also determines which pixels are connected together (e.g., which contours have similar attributes) to accordingly determine which pixels comprise a graphical object.

Once all of the graphical objects in a sample are identified, the region identifier 306 applies rules to determine a bounding region and an origin. The bounding region is used to provide consistent scaling and orientation of graphical objects for analysis by the training processor 310. The example region identifier 306 creates, highlights, or otherwise defines a region of interest (e.g., a bounding region) for each imaged graphical object. The region identifier 306 uses one or more instructions or rules to determine how to create a region of interest. The rules specify a distance that boarders of the region are to be positioned from portions of an imaged graphical object. In this manner, each bounding region has a height and a width that is based on a size of the enclosed imaged graphical object.

The region identifier 306 also uses rules to determine an origin. The rules may be applied regardless of graphical object type (e.g., an origin at the top-left most graphical object pixel) or, alternatively, the rules may be applied based on the graphical object type. The region identifier 306 assigns an origin to a sample image and may also assign coordinates to a bounding region relative to the origin of an image sample. In this manner, the bounding region is defined relative to the image of a card object and is relative to an imaged graphical object. This dual definition enables the bounding region to be associated with the appropriate location on the sample image while also enabling a location of a graphical object to be consistently analyzed for training and identification purposes based on the graphical object type.

Figure 5:
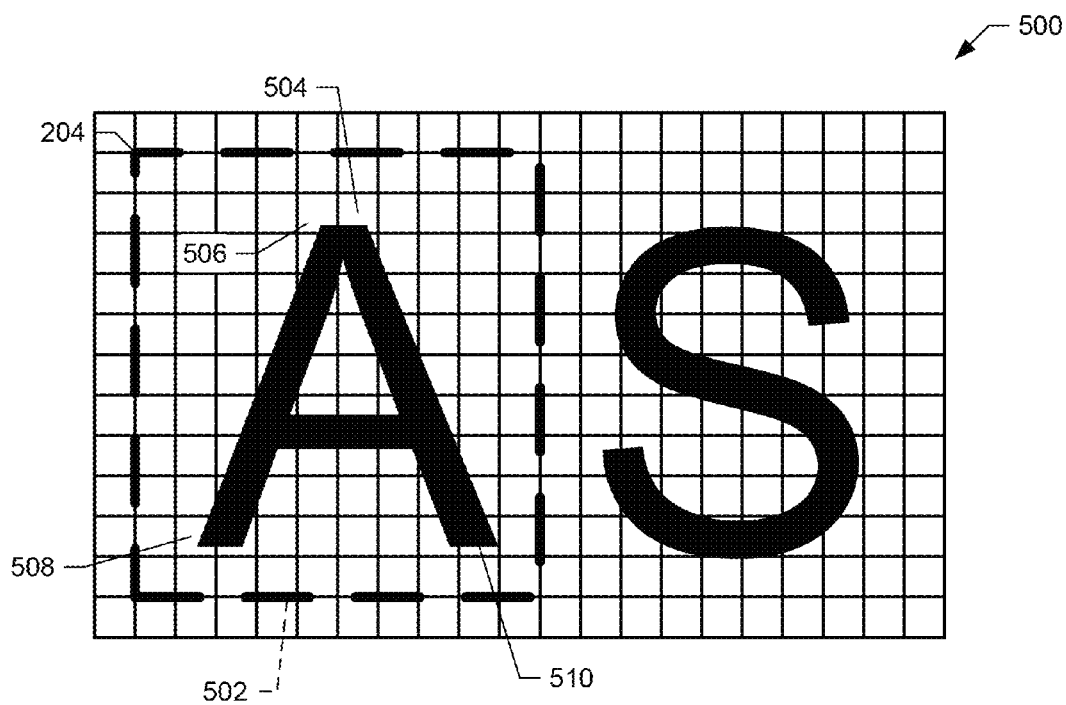
FIG. 5 shows a diagram visually depicting an analysis performed by the example training server of FIG. 2 on an imaged character or graphical object.

After designating at least one graphical object pixel to be the origin, the region identifier 306 assigns text coordinates to the other graphical object pixels relative to the origin. For example, FIG. 5 shows a diagram 500 visually depicting an analysis performed by the region identifier 306 on imaged character 'A', which is part of an imaged card object 104. In this example, the region identifier 306 determines that pixels including the color 'black' correspond to text. The region identifier 306 identifies the pixels connected together and applies pre-specified rules. In this example, a first rule indicates that a boarder of bounding region 502 is to be applied one pixel from the uppermost, rightmost, leftmost, and bottommost pixel. The region identifier 306 determines these pixels and applies the boundary. The region identifier 306 also applies a second rule that specifies that the origin is to be applied to a pixel corresponding to the upper-left most pixel. The origin is assigned coordinate (0, 0). Accordingly, the region identifier 306 designates pixel 504 as the origin. The region identifier 306 then assigns coordinates to the other pixels. For example, pixel 506 is assigned coordinate (1, 0), pixel 508 is assigned coordinate (4, 8), and pixel 510 is assigned coordinate (−3, 8). The region identifier 306 may also determine the coordinates of the bounding region 502.

It should be appreciated that applying consistent rules to the imaged graphical objects ensures that origins are applied to the same portion of graphical objects of the same type. This becomes especially useful for standard credit card fonts, which have similar maximal graphical object widths and heights. In the example above, the same top-left corner of the character 'A' is always designated as the origin. This consistent designated of the origin facilitates uniform graphical object detection and statistical probability determination for the classifier data structures.

In addition to determining pixel coordinates of graphical objects, the example region identifier 306 may also scale, rotate, and skew images of graphical objects. Similar to providing a consistent origin, providing the training processor 310 graphical objects that have relatively the same dimensions improve detection efficiency and accuracy. For example, some sample images may be recorded with a relatively greater zoom, rotation, or angle. The region identifier 306 may include one or more rules that specify that graphical objects are to be sized, for example, between 8 to 9 pixels in height and 5 to 9 pixels in width. Thus, a graphical object that is initially 20 pixels in height is scaled by the region identifier 306 to have a height between 8 and 9 pixels.

iv) Training Data Accumulator

After the region identifier 306 has determined bounding regions and graphical object pixel coordinates for each imaged sample, the example training server 202 of FIG. 3 uses the training data accumulator 308 to prepare the samples for statistical analysis. To prepare the samples, the training data accumulator 308 associates the coordinates of each graphical object with the corresponding imaged sample. For instance, the region identifier 306 outputs a text file for each identified graphical object in a sample. The text file includes, for example, coordinates of pixels of the graphical object relative to an origin. The text file may also include coordinates of the bounding region relative to the origin and a location of the bounding region relative to the dimensions of the imaged sample (e.g., a location within an imaged sample). In some embodiments, the region identifier 306 may create one text file for each sample that includes pixel coordinates for each graphical object detected with the sample.

The training data accumulator 308 associates the text files to the respective sample image by matching the location of the bounding region relative to the sample to the image. This association may be verified by quality assurance personnel and/or automated by an image processor that ensures the identified graphical object pixels are aligned with the appropriate imaged graphical objects. In instances where the coordinates do not align precisely with an image, the training data accumulator 308 modifies the appropriate coordinates to achieve proper alignment.

In addition to associating text files with corresponding images, the training data accumulator 308 is configured to compile processed samples until the training processor 310 is available. For instance, the training server 202 may be instructed to process 1000 samples of card objects. In this instance, the training data accumulator 308 accordingly holds the processed samples until all the samples are available to be analyzed by the training processor 310.

The training data accumulator 308 also can be configured to queue the samples processed by the region identifier 306 so that the training processor 310 may cycle through each permutation of a specific card object 104. As mentioned before, the sample imager 302 records images of the same card object 104 under different conditions. The training data accumulator 308 accordingly stores processed images from the same card object 104 until all of the permutations are available to be analyzed. The training data accumulator 308 may determine which processed sample images correspond to which card objects 104 based, for example, on an identifier or serial number that is applied by the sample imager 302 during imaging. In this embodiment, all images from the same card object 104 are assigned the same serial number.

iv) Training Processor

To determine a statistical probability that an imaged graphical object corresponds to a particular graphical object type, the example training server 202 of FIG. 3 includes the training processor 310. The example training processor 310 is configured to determine a graphical object type for each imaged graphical object and determine probabilities that features are present (or not present) for each graphical object in a given sample. The training processor 310 combines probabilities for the same graphical object type and outputs the combination in a classifier data structure.

To determine a graphical object type of a processed imaged graphical object, the example training processor 310 may be configured to determine, for each imaged graphical object, which features have the greatest probabilities and match those features to a graphical object type. For instance, the graphical object type database 318 may include instructions that specify which features correspond to which graphical object types. The training processor 310 uses these instructions to accordingly determine a graphical object type of an imaged graphical object. It should be appreciated that the instructions are configured to reduce the chances of a complete overlap of features for two or more graphical object types. In this manner, there is only one possible graphical object type for a given combination of features.

Alternatively, the training processor 310 determines the graphical object type by comparing coordinates of imaged graphical object pixels to one or more data structures within the graphical object type database 318 that define relatively standard pixel coordinates for each graphical object type. Similar to determining the probability, the training processor 310 compares the pixel coordinates of the imaged pixel to each of the pixel coordinates for the graphical object types and selects the graphical object type with the most matching pixel coordinates (or shortest distance between all pixel coordinates). The training processor 310 then associates the calculated probabilities for each feature for the imaged graphical object with the known graphical object type. In yet other embodiments, the graphical object type may be specified by personnel.

To determine probabilities that a particular graphical object feature (or combination of graphical object features) are present (or not present) in a given sample, the example training processor 310 cycles through the positive and negative samples. To determine the statistical probability, the training server 310 accesses the feature database 316, which includes definitions of the specific features in which a probability is calculated. The training server 310 also accesses a graphical object type database 318, which includes definitions of which graphical object types are to be identified. The databases 316 and 318 may be implemented by any computer-readable medium, including RAM, ROM, flash memory, magnetic or optical disks, optical memory, or other storage media.

Figures 6, 7:
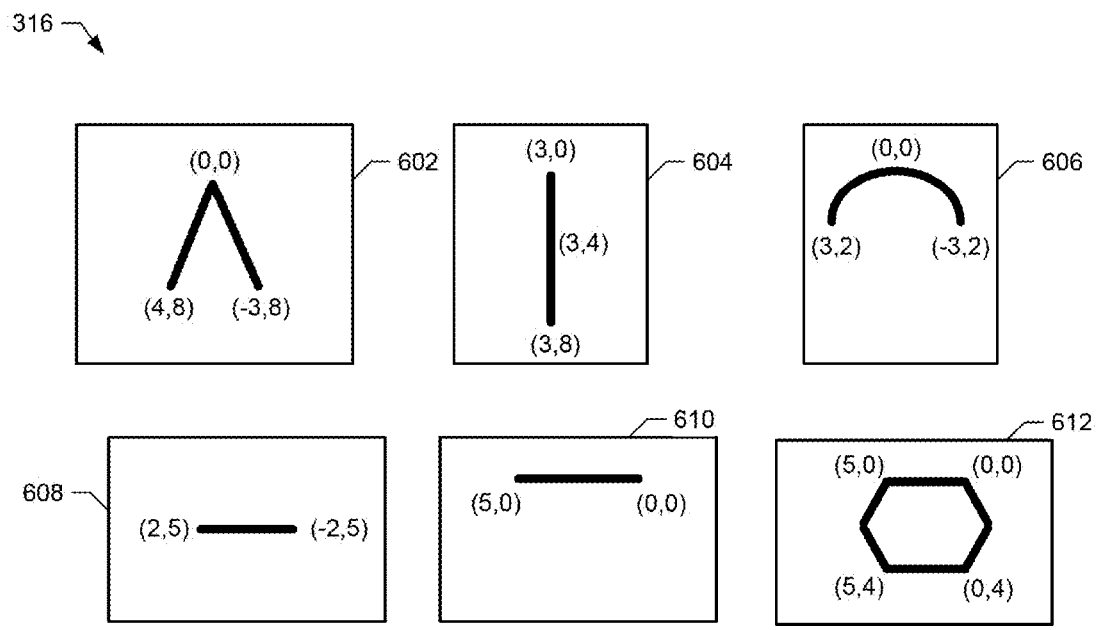
FIG. 6 shows a diagram of a graphical representation of features defined within a feature database used by the example training server of FIG. 2.
FIG. 7 shows graphical representations of example classifier data structures used by the example training server of FIG. 2.

FIG. 6 shows a diagram of a graphical representation of features defined within the feature database 316. In this illustration, the database 316 includes definitions for at least six features 602, 604, 606, 608, 610, and 612. The features may be defined based on common properties among different types of graphical objects. The features may also be defined based on specific properties of one or more graphical objects. In should be appreciated that the training processor 310 (or another component of the training server 202) determines the features by analyzing portions of graphical object types defined within the database 318. For example, the database 318 may include definitions for all letters of the English alphabet, numbers, and ASCII symbols. Alternatively, personnel may define the features after reviewing the graphical object types to be analyzed.

The illustrated example shows features that include single line segments (e.g., features 604, 608, and 610), two line segments that form an angle (e.g., feature 602), a curved line segment (e.g., feature 606), and a polygon (e.g., feature 612). In other examples, the features can include, tesseracts, point clouds, SVMs, textures, ratios, markov models, etc. Further, the features can be derived from groups of pixels, such as, for example, a histogram of pixel shading among one or more vectors specified by coordinates.

While FIG. 6 shows the features 602-612 as graphical representations of line segments, the features stored to the database 316 include pixel coordinates corresponding to portions of the line segments. For instance, the feature 602 is defined by coordinates (4, 8), (0, 0), and (−3, 8). In this example, the coordinates correspond to the ends of the line segments. The coordinates are specified relative to an origin that is substantially similar to a matching graphical object type. Here, the origin at the junction of the two line segments corresponds to an origin that is assigned by the region identifier 306 to 'A' graphical object types. Specifying the coordinates relative to a same origin as assigned to a corresponding graphical object type enables the training processor 310 to make comparisons between the pixel coordinates of imaged graphical objects and pixel coordinates of features.

Similarly, the coordinates (3, 0), (3, 4), and (3, 8) of feature 604 correspond to pixels relative to an origin for a 'B' graphical object type, and the coordinates (3, 2), (0, 0), and (−3, 2) of feature 606 correspond to pixels relative to an origin for a 'C' graphical object type. It should be noted that features 608 and 610 are linear line segments. However, the difference in coordinates relative to an origin is used to determine a probability that each feature is present in different graphical object types based on a location of a line segment relative to the overall graphical object shape. In other words, the feature 608 has a high probability of being present for 'E', 'F', and 'H' graphical object types while the feature 610 has a high probability of being present for 'E', 'F', 'T', 'R', 'Z', and '7' graphical object types.

It should be appreciated that storing only the pixel coordinates in one or more text files within the feature database 316 is relatively more efficient than storing images of graphical object features because the training processor 310 can compare pixel coordinates of imaged samples to pixel coordinates of features more easily than comparing images of features to images of samples. In the former instance, the training processor 310 is performing a numeric comparison between coordinates while in the latter instance the training processor 310 would have to perform a relatively complex image analysis. This configuration of comparing pixel coordinates enables the training processor 310 to accurately determine probabilities for large quantities of samples within relatively short periods of time.

To determine a probability that each feature is present (or not present) for each graphical object type, the example training processor 310 compares the pixel coordinates of the images samples to the pixel coordinates of the features. The probability is calculated based on the degree of a match between the pixel coordinates for all of the samples. The probability may also be calculated based on a distance between the pixel coordinates of the sample and the feature. The probability may also be computed for each positive sample in conjunction with one or more negative samples.

It should be appreciated that the use of consistent rules for defining an origin of imaged graphical objects, defining bounding regions, and sizing imaged graphical objects reduces the amount of analysis performed by the training processor 310. For instance, instead of having to scale and rectify features for each imaged graphical object, the training processor 310 determines probabilities by performing relatively more efficient calculations of differences between coordinates of graphical object pixels and coordinates of features. These calculations can include vector distance calculations between pixel coordinates and/or area calculations of overlapping pixels.

For instance, the training processor 310 compares the graphical object within the bounding region 502 of FIG. 5 to the features 602-612 of FIG. 6. The training processor 310 determines that the pixels of the feature 602 substantially match locations of the imaged graphical object pixels (or are substantially close to the locations of pixels). Accordingly, the training processor 310 determines that there is a 100% probability that feature 602 is present in the imaged graphical object. Additionally, the training processor 310 determines that only some pixels of the imaged graphical object match the feature 604. Accordingly, the training processor 310 determines that there is, for example, a 15% probability that feature 604 is present in the imaged graphical object. The training processor 310 also determines probabilities for the other features 606-610.

In addition to determining probabilities that a feature is present in an imaged graphical object, the example training processor 310 may also be configured to determine probabilities that a feature is not present in an imaged graphical object. In this embodiment, the training processor 310 determines a probability by determining that coordinates of a feature do not coincide and/or are located a relatively far distance from pixels of an imaged graphical object. Thus, the more distance between feature pixels and graphical object pixels, the greater a probability the feature is not present within the graphical object.

To further determine a probability that features are present (or not present) for a graphical object type, the example training processor 310 combines probabilities for each analyzed graphical objects. This combination of probabilities of graphical objects imaged under different conditions and from different types of card objects compensates in differences between individual graphical objects of the same graphical object type. For instance, some card objects may use block-based graphical objects while other card objects use more rounded graphical objects. Combining probabilities for these different card objects ensures that the different versions of the same graphical object type are correctly identified.

iv) Output File Generator

To create classifier data structures based on the determined probabilities of features for each graphical object type, the example training server 202 of FIG. 3 includes the output file generator 312. FIG. 7 shows graphical representations of example classifier data structures 702, 704 and 706. It should be appreciated that FIG. 7 shows only a few classifier data structures for the many possible graphical object types. In addition, for brevity, each classifier data structure is shown including probabilities and definitions of three features (e.g., F1 602, F2 604, and F3 606). In other examples, the classifier data structures can include probabilities and definitions for additional features including probabilities of features not being present for a particular graphical object type.

In this example, the classifier data structure 702 includes probabilities that certain features are included within the 'A' graphical object type, the classifier data structure 704 includes probabilities that certain features are included within the 'B' graphical object type, and the classifier data structure 706 includes probabilities that certain features are included within the 'C' graphical object type. The classifier data structures 702 can include an XML file or any other common file format. Further, while the classifier data structures 702-706 are shown as separate data structures, in other embodiments, the data structures 702-706 may be combined into a single data structure. In addition to creating classifier data structures, the example output file generator 312 is configured to store the data structures to the classifier database 320.

The output file generator 312 may also be configured to store each sample image including the pixel coordinates of imaged graphical objects and corresponding bounding regions to the classifier database 320. The retention of the samples enables the training processor 310 to recalculate feature probabilities in instances where additional samples are received, feature definitions change, image proportions change, etc. Moreover, in some embodiments, the output file generator 312 may use the stored image samples to create classifier data structures that include relationship definitions that reference each of the stored images of the samples, the physical size of the sampled card object, and the coordinates of the corresponding graphical object pixels and bounding regions.

v) Client Interface

To provide classifier data structures to client devices 102, the example training server 202 includes the client interface 314. The example client interface 314 is configured to receive requests for classifier data structures and transmit a copy of the stored data structures from the requesting device 102. In some embodiments, the client interface 314 may also combine the classifier data structures with the graphical object recognition algorithm 103 for transmission to a client device 102. The client interface 314 may also be configured to push updates of the classifier data structures to client devices 102 that have already received a previous version of the data structures.

In other embodiments, the client interface 314 may provide the classifier data structures and/or the graphical object recognition algorithm 103 to, for example, merchant servers and/or application developers. In these other embodiments, the graphical object recognition algorithm 103 and classifier data structures are included within apps (e.g., payment or shopping apps) sent to a client device 102 or downloadable content that is used, for example, in a web browser to complete a transaction.

vi) Feedback

In addition to determining statistical probabilities that a particular feature is present (or not present) in a graphical object type based on samples, the example training server 202 of FIG. 3 may also be configured to amend, refine, or calculate probabilities based on feedback from client devices 102. For example, the graphical object recognition algorithm 103 may include a feature that detects when graphical objects were not determined correctly. The feature could include a prompt requesting a user to verify the determined graphical objects and indicate any misidentified graphical objects. The graphical object recognition algorithm 103 may then transmit to the client interface 314 one or more recorded images of the user's card object in conjunction with the information indicating the misidentified graphical objects and the user-provided correct graphical objects. The graphical object recognition algorithm 103 may also provide the correctly identified graphical objects.

The client interface 314 forwards the received information to the training processor 310, which amends the calculated probabilities. For instance, the training processor 310 operates in conjunction with the region identifier 306 to identify which graphical object was misidentified, determine pixel coordinates, an origin, and a bounding region for the graphical object, and recalculate feature probabilities. The recalculation may result in the reduction of probabilities of relevant features that are present (or not present) in the misidentified graphical object. The training processor 310 may also identify the user-provided correct graphical object, determine pixel coordinates, an origin, and a bounding region for the graphical object, and recalculate feature probabilities. The recalculation may result in the increase of probabilities of relevant features that are present (or not present) in the user-provided graphical object. The training processor 310 then operates in conjunction with the output file generator 312 to adjust the probabilities of the affected graphical objects.

It should be appreciated that the training system 202 may also be configured to receive feedback from substantially all users of the graphical object recognition algorithm 103 (e.g., crowd-sourcing). For example, the graphical object recognition algorithm 103 may transmit a result, including an image of a card object and the identified graphical objects, of any payment transaction (regardless of whether a graphical object was misidentified) to the client interface 314. The training server 202 uses these results as additional samples and updates the feature probabilities accordingly.

Processor

Figure 8:
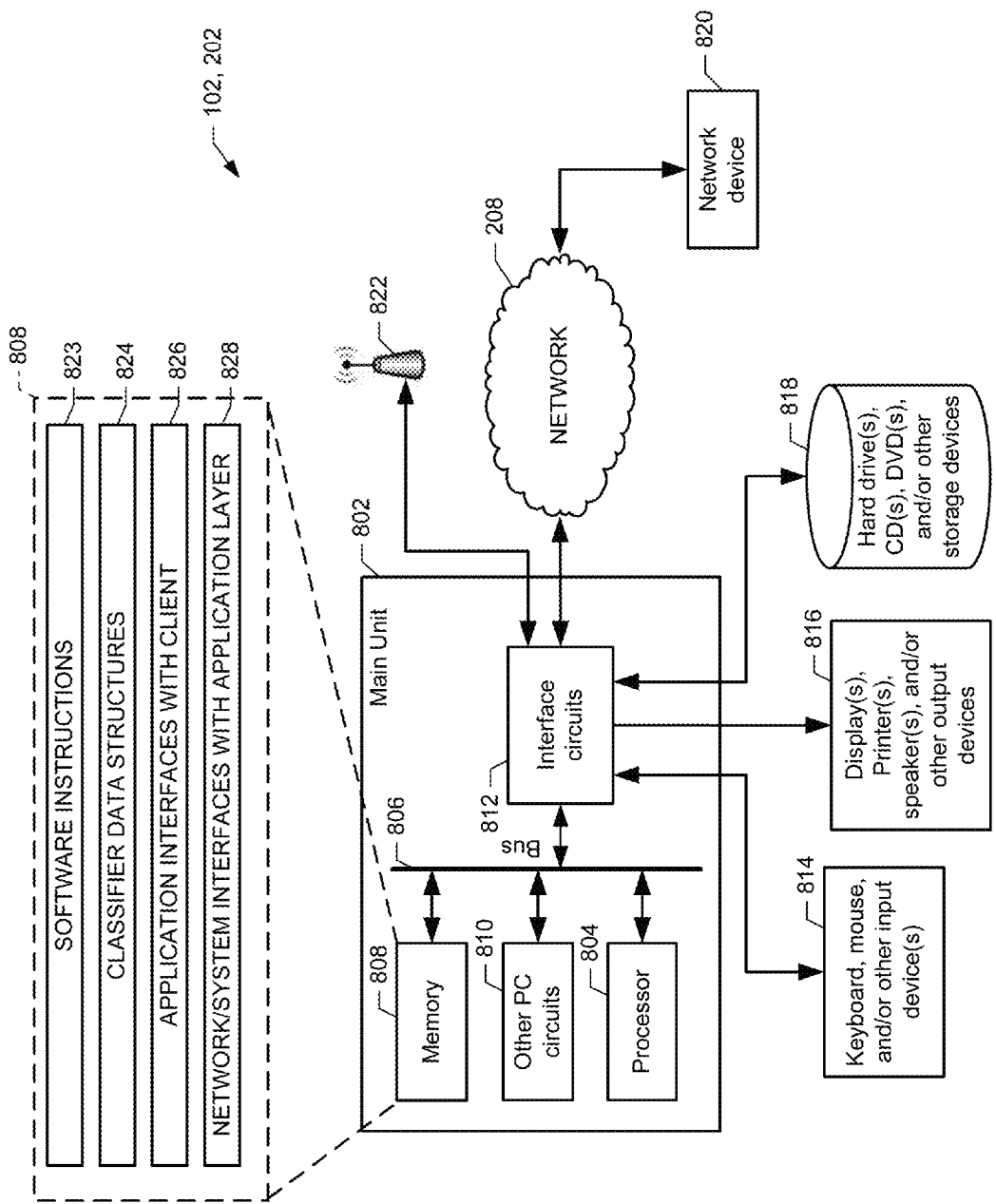
FIG. 8 is a functional block diagram showing electrical systems of an example computing device (e.g., a training server, and/or a client device) of FIGS. 2 and 3).

A detailed block diagram of electrical systems of an example computing device (e.g., the training server 202 and/or the client device 102) is illustrated in FIG. 8. In this example, the training server 202 and/or the client device 102 includes a main unit 802 which preferably includes one or more processors 804 communicatively coupled by an address/data bus 806 to one or more memory devices 808, other computer circuitry 810, and one or more interface circuits 812. The processor 804 may be any suitable processor, such as a microprocessor from the INTEL PENTIUM® or CORE™ family of microprocessors. The memory 808 preferably includes volatile memory and non-volatile memory. Preferably, the memory 808 stores a software program that interacts with the other devices in the environment 200, as described above and below. This program may be executed by the processor 804 in any suitable manner. In an example embodiment, memory 808 may be part of a "cloud" such that cloud computing may be utilized by the training server 202 and/or the client device 102. The memory 808 may also store digital data associated with classifier data structures, images of samples, coordinates of pixels, purchase history, consumer profiles, salable items, programs, meta-data, web pages, etc. processed by the training server 202 and/or the client device 102 and/or loaded via an input device 814.

The example memory devices 808 store software instructions 823, classifier data structures 824, user interface features, permissions, protocols, configurations, and/or preference information, and/or application interface information 826 (e.g., information for accessing and using classifier data structures in conjunction with the graphical object recognition algorithm 103). The memory devices 808 also may store network or system interface features, permissions, protocols, configuration, and/or network interface information 828 (e.g., information associated with the client interface 314) for use by the training server 202 and/or the client device 102. It will be appreciated that many other data structures and records may be stored in the memory device 808 to facilitate implementation of the methods and apparatus disclosed herein. In addition, it will be appreciated that any type of suitable data structure (e.g., a flat file data structure, a relational database, a tree data structure, etc.) may be used to facilitate implementation of the methods and apparatus disclosed herein.

The interface circuit 812 may be implemented using any suitable interface standard, such as an Ethernet interface and/or a USB interface. One or more input devices 814 may be connected to the interface circuit 812 for entering data and commands into the main unit 802. For example, the input device 814 may be a keyboard, mouse, touch screen, track pad, track ball, isopoint, image sensor, graphical object recognition, barcode scanner, microphone, and/or a speech or voice recognition system.

One or more displays, printers, speakers, and/or other output devices 816 may also be connected to the main unit 802 via the interface circuit 812. The display may be a cathode ray tube (CRTs), a liquid crystal display (LCD), or any other type of display. The display generates visual displays generated during operation of the training server 202 and/or the client device 102. For example, the display may provide a user interface and may display a payment transaction completed by imaging a card object 104. A user interface may include prompts for human input from a user of the client device 102 including links, buttons, tabs, checkboxes, thumbnails, text fields, drop down boxes, etc., and may provide various outputs in response to the user inputs, such as text, still images, videos, audio, and animations.

One or more storage devices 818 may also be connected to the main unit 802 via the interface circuit 812. For example, a hard drive, CD drive, DVD drive, and/or other storage devices may be connected to the main unit 802. The storage devices 818 may store any type of data, such as purchase history, records, requirements, transaction data, operations data, classifier data structures, images of samples, statistical data, security data, etc., which may be used by the training server 202 and/or the client device 102.

The training server 202 and/or the client device 102 may also exchange data with other network devices 820 via a connection to the Internet or a wireless transceiver 822 connected to the Internet. The network connection may be any type of network connection, such as an Ethernet connection, digital subscriber line (DSL), telephone line, coaxial cable, wireless connection, etc.

Network devices 820 may include one or more servers, which may be used to store certain types of data, and particularly large volumes of data which may be stored in one or more data repository. A server may include any kind of data including databases, programs, files, libraries, records, images, documents, requirements, transaction data, operations data, configuration data, purchase information, statistical data, security data, etc. A server may store and operate various applications relating to receiving, transmitting, processing, and storing the large volumes of data. It should be appreciated that various configurations of one or more servers may be used to support and maintain the environment 200. For example, servers may be operated by various different entities. Also, certain data may be stored in the training server 202 and/or the client device 102 which is also stored on a server, either temporarily or permanently, for example in memory 808 or storage device 818.

Access to the training server 202 and/or the client device 102 can be controlled by appropriate security software or security measures. An individual users' access can be defined by the training server 202 and/or the client device 102 and limited to certain data and/or actions. Accordingly, users or consumers of the environment 200 may be required to register with the training server 202.

Flowchart of Example Creation of Classifier Data Structures

Figure 9:
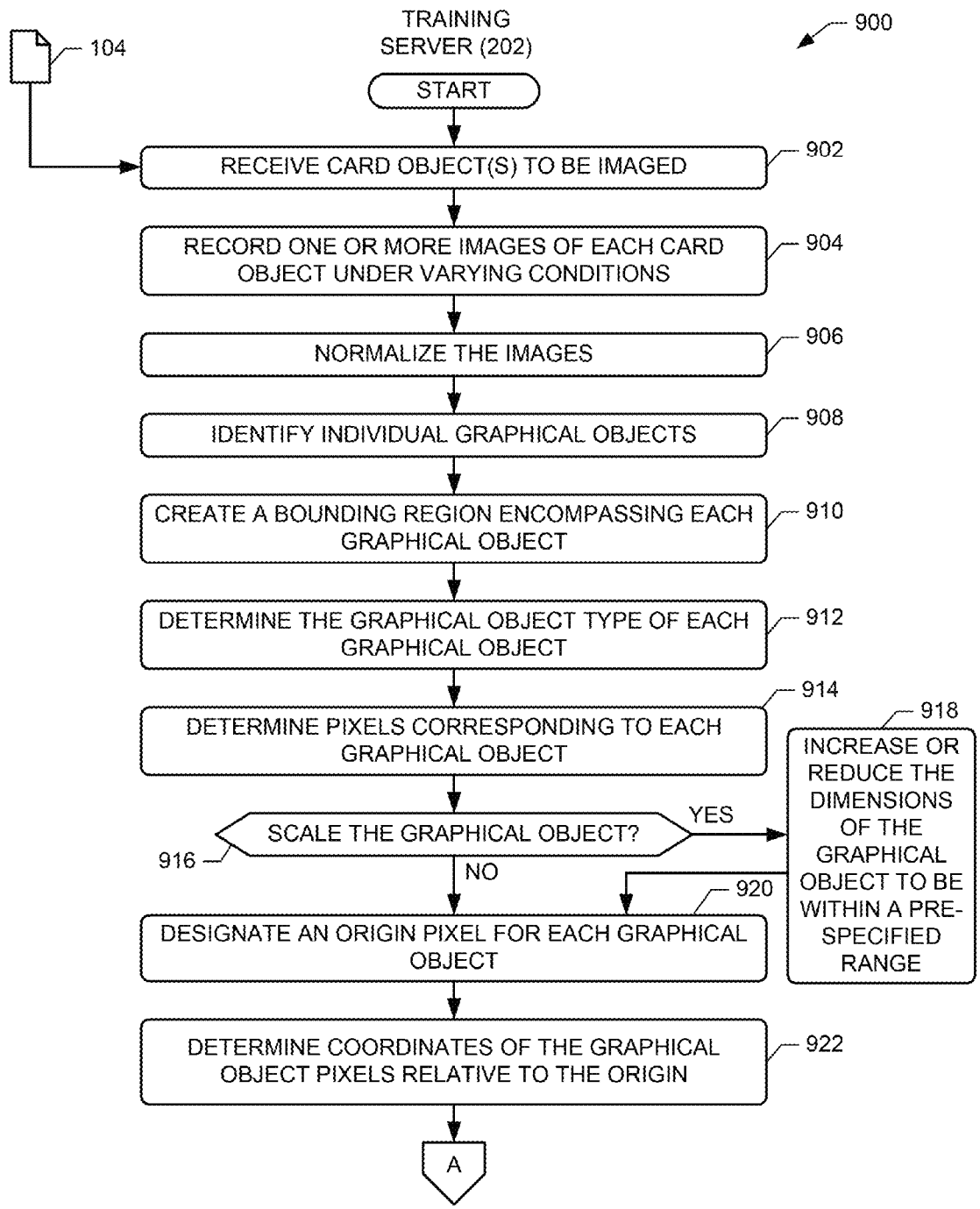
FIGS. 9 and 10 show a flow diagram illustrating example procedures to create classifier data structures, according to an example embodiment of the present disclosure.
Figure 10:
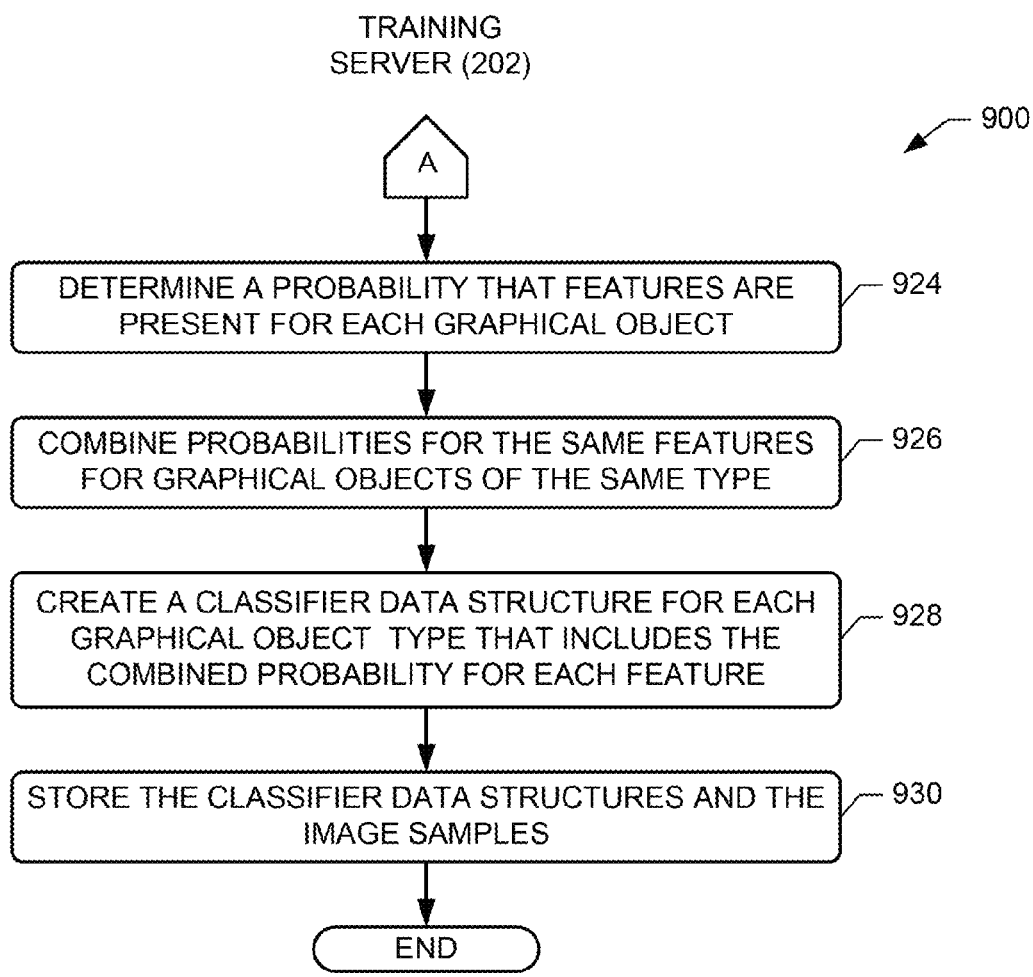

FIGS. 9 and 10 show a flow diagram illustrating example procedure 900 to create classifier data structures, according to an example embodiment of the present invention. The example procedure 900 may be carried out by, for example, the training server 202 described in conjunction with FIGS. 2 to 4. Although the procedure 900 is described with reference to the flow diagram illustrated in FIGS. 9 and 10, it will be appreciated that many other methods of performing the functions associated with the procedure 900 may be used. For example, the order of many of the blocks may be changed, certain blocks may be combined with other blocks, and many of the blocks described are optional.

The procedure 900 begins when the training server 202 receives at least one card object 104 to be processed (block 902). The training server 202 records one or more images of each card object (block 904). In some instances, the training server 202 is configured to record images under varying lighting, environmental, and physical conditions of the card objects 104. Moreover, the training server 202 may also record one or more negative images of the card objects 104.

The example training server 202 next normalizes the images, as described in conjunction with FIG. 3 (block 906). The training server 202 then identifies individual graphical objects within each of the images (block 908), determines pixels corresponding to each graphical object (block 910), and creates a bounding region encompassing each graphical object (block 912). In some embodiments, the training server 202 identifies graphical objects by determining one or more pixel colors associated with the color of the graphical objects. In other embodiments, the training server 202 may identify graphical objects by combining adjacent pixels with similar contours. The training server 202 also compares the colors of the graphical objects to the background color of the card object in the image and uses spacing between groups of pixels to isolate each graphical object.

The example training server 202 also determines a graphical object type for each graphical object (block 914). In some embodiments, the training server 202 determines the graphical object type by comparing pixel coordinates of each graphical object to standard pixel locations of each graphical object type and selects the graphical object type with the most matching pixel locations. The training server 202 may also receive an input from personnel regarding the graphical object type. Alternatively, the input of the graphical object types may be provided by scanning the magnetic strip of a card object. In yet further embodiments, the graphical object type is determined based on which features have a relatively high probability of being present (or not present) for each graphical object.

The example procedure 900 of FIG. 9 next determines whether any of the imaged graphical objects should be scaled by the training server 202 (block 916). The training server 202 may make the determination by comparing pixel height and/or width of imaged graphical objects and/or bounding regions to predefined heights and/or widths. Responsive to determining that a graphical object is to be scaled, the training processor 202 increases or decreases the dimensions of the graphical object to be within a pre-specified range (block 918).

The example training server 202 then designates an origin pixel for each graphical object (block 920) and determines coordinates of the other graphical object pixels relative to the origin (block 922). The training server 202 may also determine coordinates of the bounding region. The training server 202 further may determine the location of each bounding region relative to the dimensions of the respective card object and associated the image with the bounding region.

The example procedure 900 of FIG. 10 continues by the training server 202 determining a probability that features are present (or not present) for each graphical object (block 924).

As described in conjunction with FIG. 3, determining the probability includes comparing coordinates of features to coordinates of graphical object pixels and using the difference between the coordinates as an indicate as to how probable the feature is included with the graphical object. The training server 202 combines probabilities for the same features for graphical objects of the same type (block 926).

The training server 202 then creates a classifier data structure for each graphical object type that includes the combined probability for each feature (block 928). The training server 202 may also include a definition of the features within the data structure including pixel coordinates. The training server 202 next stores the classifier data structures to a database, which is used as a repository to provide copies of the data structures to client devices (block 930). In some embodiments, the training server 202 may also store the recorded images in conjunction with the bounding regions to the database. The example procedure 900 then ends. In alternative, embodiments, the example procedure 900 returns to block 902 when additional card objects are to be imaged or block 924 when feedback is received from a client device regarding a misidentified graphical object.

Figure 11:
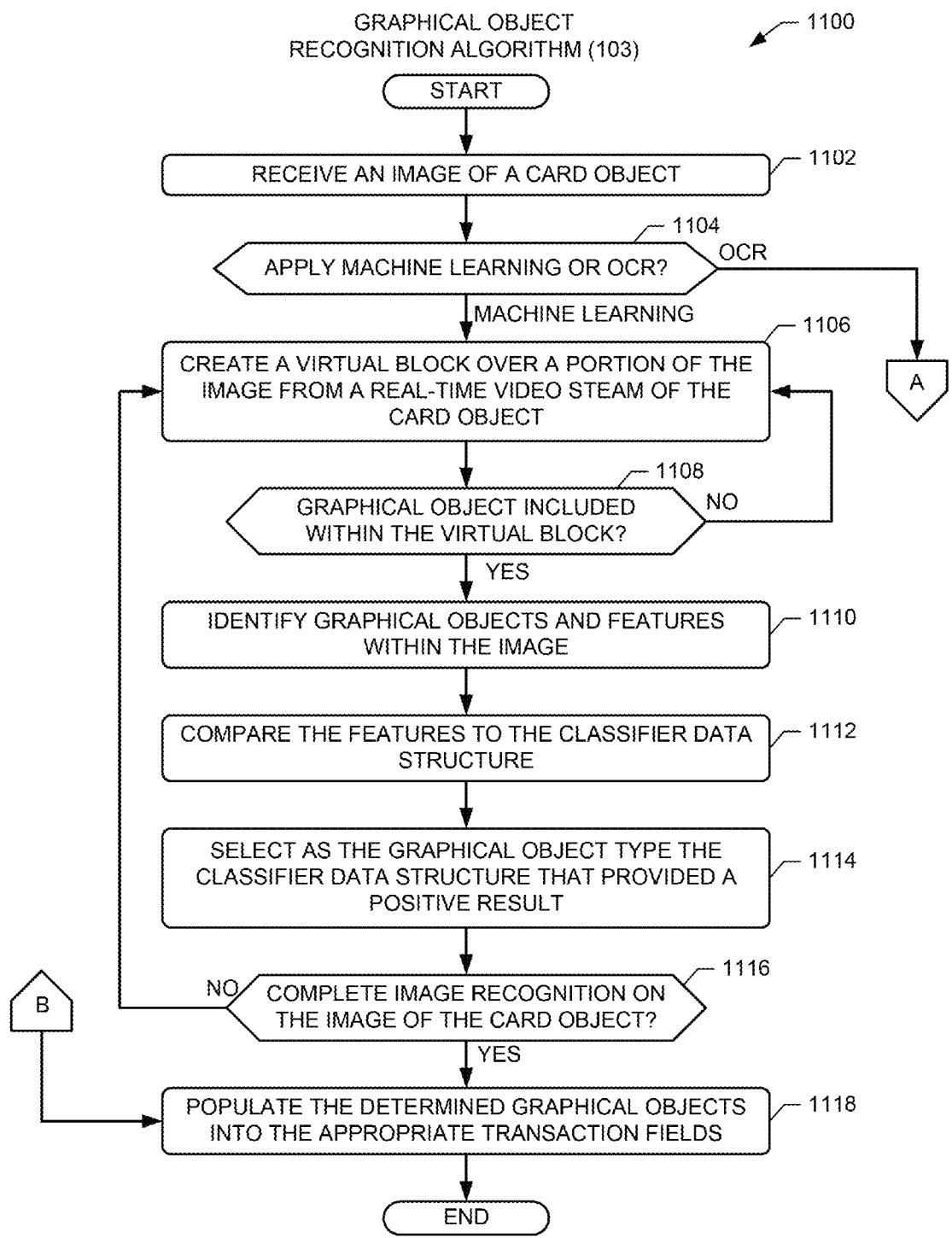
FIGS. 11 and 12 show a flow diagram illustrating example procedures to use classifier data structures to identify graphical objects on a card object, according to an example embodiment of the present disclosure.
Figure 12:
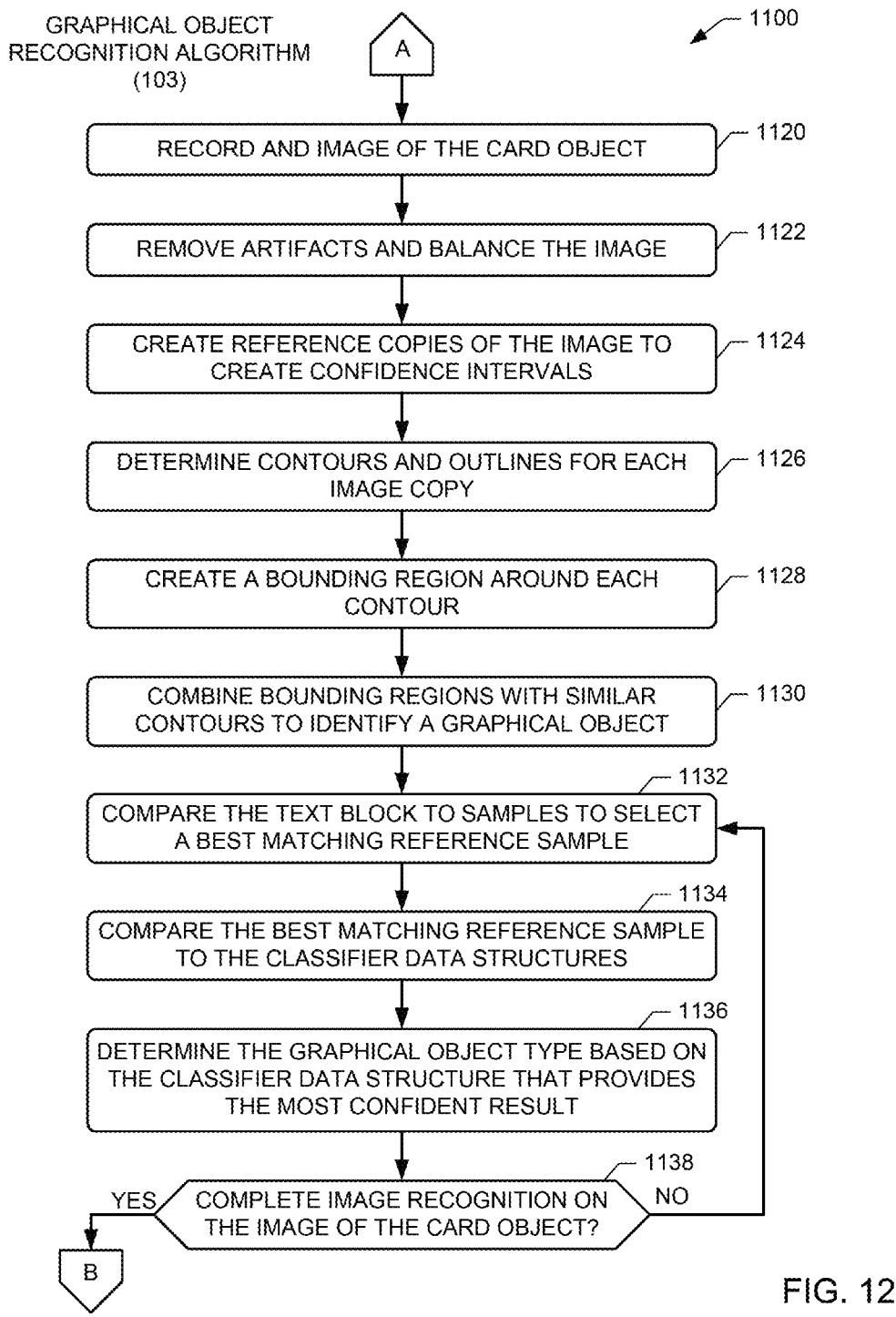

Flowchart of Example Graphical Object Detection Using Classifier Data Structures FIGS. 11 and 12 show a flow diagram illustrating example procedure 1100 to detect graphical objects on a card object using classifier data structures, according to an example embodiment of the present invention. The example procedure 1100 may be carried out by, for example, the graphical object recognition algorithm 103 described in conjunction with FIGS. 1 to 4. Although the procedure 1100 is described with reference to the flow diagram illustrated in FIGS. 11 and 12, it will be appreciated that many other methods of performing the functions associated with the procedure 1100 may be used. For example, the order of many of the blocks may be changed, certain blocks may be combined with other blocks, and many of the blocks described are optional. It should be appreciated that the example procedure 1100 may also be used to determine graphical objects included within non-bounded information sources such as, for example, displays, paper, etc.

The procedure 1100 begins when the graphical object recognition algorithm 103 receives an image of a card object, which is being used in a payment transaction submitted by a client device 102 (block 1102). The graphical object recognition algorithm 103 determines whether to apply a machine learning algorithm or an OCR algorithm (block 1104). The graphical object recognition algorithm 103 makes the determination based, for example, on a quality of the image, a quality of the card object, a confidence regarding a result from each algorithm, processing capability of the client device 102, card object type, etc. In some example, the graphical object recognition algorithm 103 may use one algorithm if a graphical object type cannot be determined from the other algorithm.

Responsive to determining that the machine learning algorithm is to be used, the graphical object recognition algorithm 103 creates or applies a virtual block over at least a portion of an image of the card object from a real-time video stream (block 1106). The graphical object recognition algorithm 103 then determines whether a graphical object is located within the virtual block. To determine if a graphical object is present, the graphical object recognition algorithm 103 may identify individual pixels and determine if connected groups of pixels (or use information derived from groups of pixels) match at least one graphical object type. Alternatively, the graphical object recognition algorithm 103 may determine if there is a change in colors or shading within the virtual block, which is indicative of graphical objects. If a graphical object is not included within the virtual block, the graphical object recognition algorithm 103 applies another virtual block to another portion of an image (e.g., slides the virtual block to an adjacent location on the imaged card object) (block 1106).

However, if there is a graphical object included within the virtual block, the example graphical object recognition algorithm 103 identifies graphical objects and corresponding features (block 1110). The graphical object recognition algorithm 103 then compares these known features to each of the classifier data structures (block 1112). The graphical object recognition algorithm 103 determines a result from comparing the features to each classifier data structure. Positive results indicate that the features of the imaged graphical object match at least many of the features with a relatively high probability for that classifier data structure. Negative results indicate that the features of the imaged graphical object do not match the features with a relatively high probability for that classifier data structure. It should be appreciated that a similar analysis is preformed for probabilities of features not being present. The graphical object recognition algorithm 103 selects the graphical object type that corresponds to the classifier data structure that provides a positive result (block 1114).

In an example where there are 100 classifier data structures, the graphical object recognition algorithm 103 receives 100 results (e.g., a result from each classifier). In many (if not all) circumstances, the classifier data structures are defined so that there is only one positive result for any given graphical object. In instances where there is more than one positive result, the graphical object recognition algorithm 103 selects the graphical object type with the most matching features or the graphical object type having the greatest probability of combined matching features. Alternatively, the graphical object recognition algorithm 103 may be configured to select the first classifier data structure that generates a probability over a predetermined threshold (e.g., 90%) of being a match. This alternative determination may be made when the graphical object recognition algorithm 103 uses frequency analysis and dynamic priority queuing to place the most frequently identified classifier data structures at the front of the search queue.

The example graphical object recognition algorithm 103 then determines whether there are additional graphical objects on the card object to be detected (block 1116). The graphical object recognition algorithm 103 may determine whether there are additional graphical objects by determining a location of the virtual block relative to the image of the card object. If the virtual block is at a predetermined location (e.g., a bottom right corner of the image) the graphical object recognition algorithm 103 determines that there are no additional graphical objects to be processed and proceeds to block 1118. However, if the virtual block has not reached the predetermined location, the graphical object recognition algorithm 103 returns to block 1106 and moves the virtual block to a new location on the image.

In block 1118 the example graphical object recognition algorithm 103 populates the identified graphical objects into the appropriate transaction fields. In alternative embodiments, the graphical object recognition algorithm 103 populates each graphical object into a field as the graphical object type is determined. After all fields have been populated, a user submits the information to complete the transaction and the procedure 1100 ends. Alternatively, the graphical object recognition algorithm 103 returns to block 1102 and waits for another image of a card object for a new transaction.

In block 1104, if the graphical object recognition algorithm 103 determines that an OCR algorithm is to be used, the graphical object recognition algorithm 103 records an image of the card object (block 1120). The graphical object recognition algorithm 103 then performs pre-processing on the image to balance the image and remove visual artifacts (block 1122). The balancing can include, for example, adjusting luminosity, black/white thresholds, grayscale, and/or color quantization.

The example graphical object recognition algorithm 103 next creates reference copies of the recorded image to determine separate confidence intervals for each classifier data structure (block 1124). The graphical object recognition algorithm 103 then identifies graphical objects within the image by determining contours and outlines for each image copy (block 1126), creating a bounding region around each contour (block 1128), and combining bounding regions with similar contours (block 1130). After identifying graphical objects, the graphical object recognition algorithm 103 compares a text block of each graphical object to imaged samples to select a best matching sample (block 1132). The graphical object recognition algorithm 103 determines a best matching sample by comparing features of the imaged graphical object to the features of the samples to determine which samples have the most overlap. It should be noted that when the graphical object recognition algorithm 103 is configured to compare imaged graphical objects to samples, training server 202 provides imaged samples (e.g., the samples imaged by the sample imager 302 and partitioned into individual graphical objects by the region identifier 306) to the client device 102 in conjunction with classifier data structures.

The graphical object recognition algorithm 103 compares the best matching reference sample to the classifier data structures to determine the graphical object type (block 1134). In this example, the graphical object recognition algorithm 103 determines the graphical object type based on which classifier data structure provides the most confident result of having features with relatively high probabilities matching features of the reference graphical object (block 1136). The comparison may be made by matching pixel coordinates of the features and/or performing pattern recognition using image analysis.

The graphical object recognition algorithm 103 then determines if all of the graphical objects on the card object have been identified (block 1138). The graphical object recognition algorithm 103 may determine additional graphical objects have to be identified by comparing the number of identified graphical objects to a number of detected graphical objects. If not all graphical objects have been identified, the graphical object recognition algorithm 103 returns to block 1132 and identifies the next graphical object. If all graphical objects have been identified, the graphical object recognition algorithm 103 populates the identified graphical objects into the appropriate transaction fields (block 1118). In alternative embodiments, the graphical object recognition algorithm 103 populates each graphical object into a field as the graphical object type is determined. After all fields have been populated, a user submits the information to complete the transaction and the procedure 1100 ends. Alternatively, the graphical object recognition algorithm 103 returns to block 1102 and waits for another image of a card object for a new transaction.

Non-Bounded Information Source Embodiment

The above examples describe how graphical objects are determined from a rectangular-shaped gift card. However, it should be appreciated that the training server 202 is configured to create classifier data structures using differently shaped card objects and/or non-bounded information sources in addition to rectangular card objects. Additionally, the graphical object recognition algorithm 103 is configured to determine graphical objects regardless of a shape of the card object. The graphical object recognition algorithm 103 is also configured to determine graphical objects on non-bounded information sources. In these instances, the graphical object recognition algorithm 103 infers or creates a boundary based on the location of the graphical elements. In other words, the graphical object recognition algorithm 103 (and the training server 102) is configured to create a boundary when graphical objects are included on a non-bounded information source so that the processing (and training) is consistent with the processing and detection performed for card objects.

In regards to differently shaped card objects (and rectangular-shaped card objects), the training classifier 202 is configured to detect a boundary or edge of the card object and use this boundary as a 'short cut' for determining origins for the graphical objects. In instances where the graphical objects are included on a non-bounded information source, the training server 202 is configured to operate without using a boundary. The training server 202 operates such that origins are assigned to graphical objects without reference to a boundary.

Figure 13:
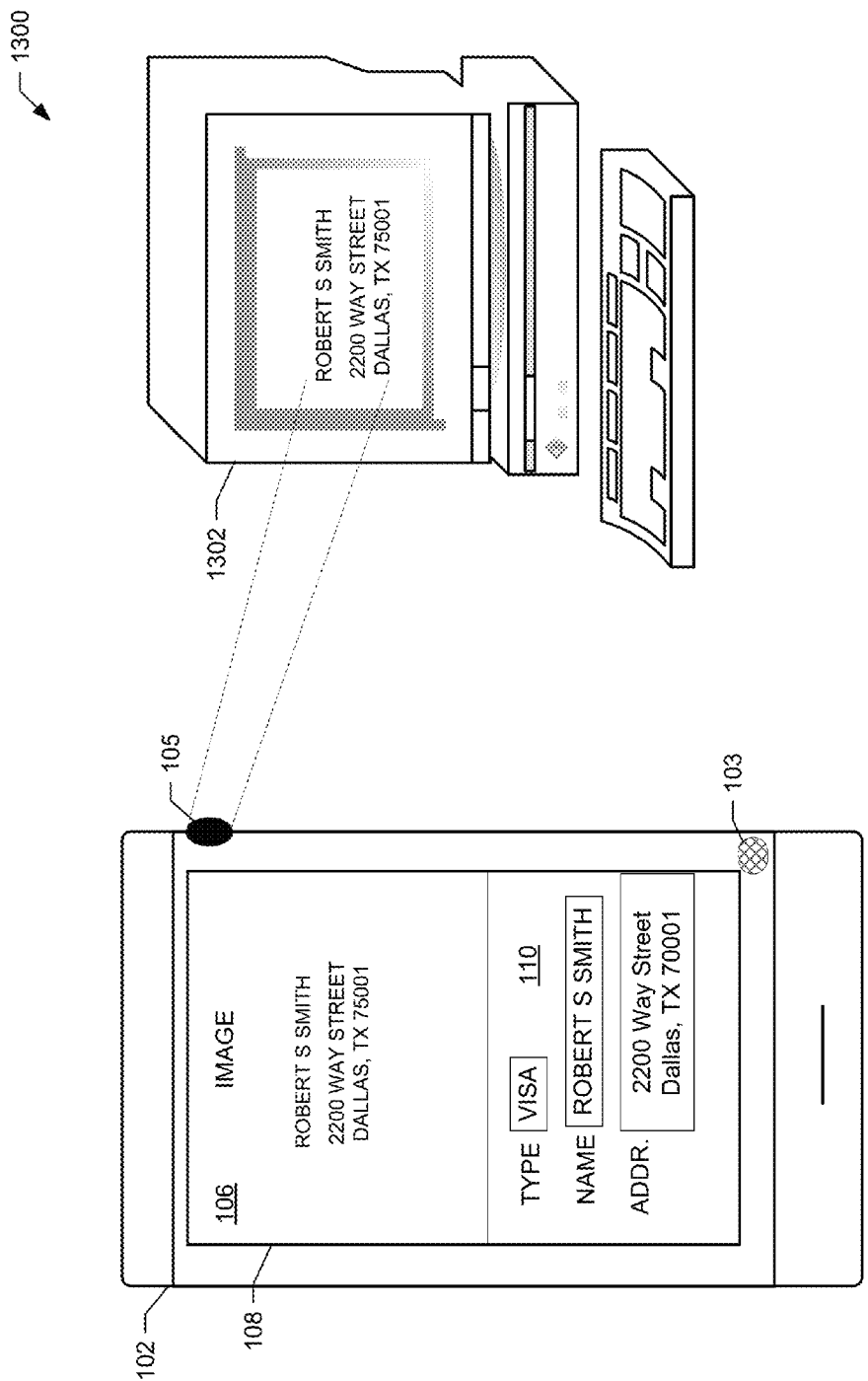
FIG. 13 shows a diagram of a payment environment where a non-bounded information source is used rather than a card object.

FIG. 13 shows a diagram of a payment environment 1300 where a non-bounded information source 1302 is used rather than a card object. As mentioned above, non-bounded information sources include information sources that have no discernable boundary when imaged by a camera 105. In this example, a computer monitor is the non-bounded information source 1302. In other examples, the non-bounded information sources 1302 can include paper, smartphone display, tablet display, outdoor advertising, televisions, posters, etc.

Similar to the payment environment 100 of FIG. 1, a user uses the client device 102 to record information displayed by the non-bounded information source 1302. The graphical object recognition algorithm 103 may also normalize, balance, and remove artifacts from the imaged information. The graphical object recognition algorithm 103 may also create a boundary for the information based on locations of the graphical elements and cause the imaged information to be displayed in the preview area 106 of display 108. At this point, the graphical object recognition algorithm 103 determines the graphical objects using the methods and procedures discussed above and populates the determined graphical objects into the appropriate fields of the payment area 110.

Additional Graphical Object Embodiments

Figure 14:
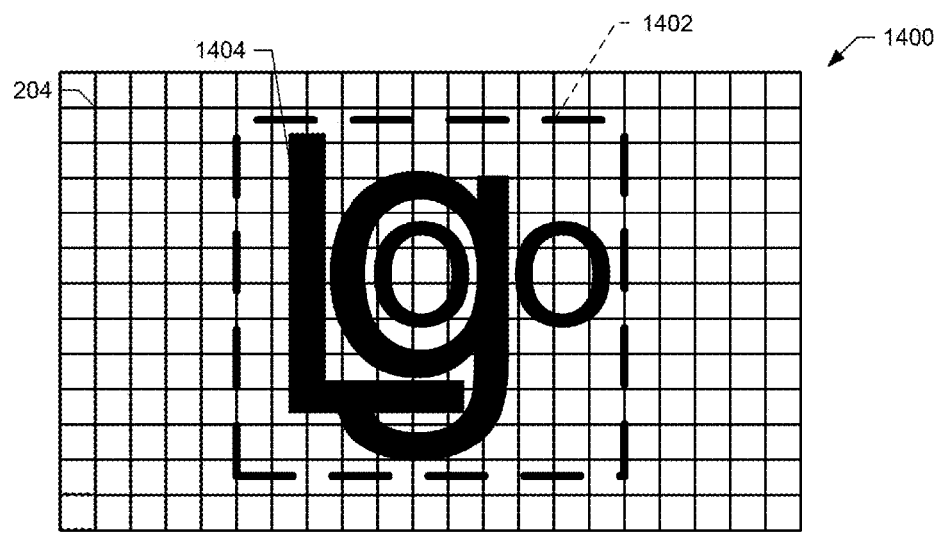
FIGS. 14 and 15 show diagrams of visually depicting an analysis performed by the example training server of FIG. 2 on pictorial graphical objects.
Figure 15:
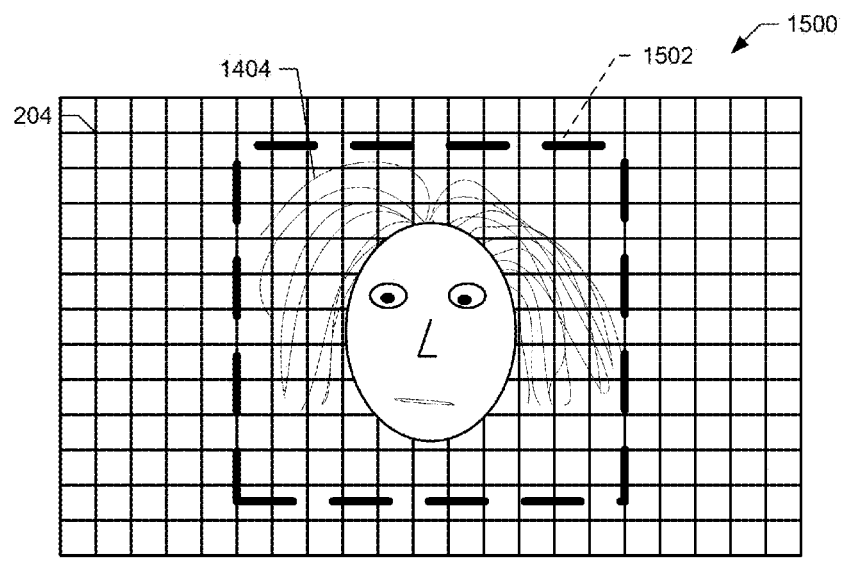

In addition to determining characters on card objects, the training server and the object recognition algorithm 103 are also configured to train and detect pictorial elements. FIGS. 14 and 15 show diagrams 1400 and 1500 of visually depicting an analysis performed by the region identifier 306 of FIG. 3 on pictorial graphical objects, which may be part of an imaged card object 104. In particular, FIG. 14 shows an imaged sample 204 where a bounding region 1402 has been applied to encompass a 'logo' graphical element and FIG. 15 shows an imaged sample 204 where a bounding region 1502 has been applied to encompass a picture graphical element of a person.

Similar to determining characters, the region identifier 306 determines which of the pixels are grouped together to comprise the logo or picture graphical element. The region identifier 306 may make the determination by identifying which pixels have similar color and/or contour attributes. The region identifier 306 also applies one or more rules to determine origin pixels 1404 and 1504.

During training, the training server 202 determines which features match the graphical elements using the same methods and procedures described above. For example, a feature that includes two concentric circles may be assigned a relatively high probability of matching the logo graphical element in FIG. 14 and a feature that includes eye shapes, a nose shape, hair may be assigned a relatively high probability of matching the picture graphical element in FIG. 15. The high probability of these features is accordingly assigned to the respective classifier data structures. In this manner, the training server 202 may have to create a different classifier data structure for each pictorial graphical object that is to be used by the graphical object recognition algorithm 103. Accordingly, feedback received from object recognition algorithms 103 regarding pictorial graphical elements may be especially useful for creating a wide array of classifier data structures capable of determining many different figures or pictures.

It should be appreciated that the graphical object recognition algorithm 103 is configured to determine the graphical elements by applying the classifier data structures using the methods and procedures described above. In this example, a classifier data structure associated with the logo graphical object generates the greatest probability of a match. In other embodiments, the classifier data structure may be more generally defined so that just the presence of the logo graphical object is detected. The graphical object recognition algorithm 103 may be configured to only determine a type of picture and not the specific content within the picture. For example, the graphical object recognition algorithm 103 may determine that the graphical object in FIG. 15 is a female with an age between 25 to 30 years instead of identifying the actual person.

Additional Aspects of the Disclosure

It should be appreciated that the example methods, apparatus, and system disclosed herein include information storage and retrieval, supervised and unsupervised machine learning, image processing, pattern recognition, and object detection within an image. The example methods, apparatus, and system disclosed herein also include distributed information storage, retrieval, and processing among a plurality of microprocessors and/or among a plurality of apparatuses connected to a network. For example, the methods, apparatus, and system disclosed herein may provide progressive and distributed training of classifier data structures as 30 image samples that are uploaded from a computer camera. One processor or server can capture 300 images and perform classification and machine learning on 50 of those images while also uploading image samples to another processor or server, which performs machine learning on the remaining 250 images. These processor or servers then communicate to combine results into one classifier data structure for each graphical object type.

It should also be appreciated that the example methods, apparatus, and system disclosed herein process information in real-time and are time sensitive. Processing in real time includes dropping video frames, accumulating information over a specific period of time, and deriving features or process branching based on timing requirements. This includes, for example, accumulating edges to enable detection across multiple frames or synchronizing multiple microprocessors to optimize detection or training for a given arrangement of microprocessors (e.g., GPU+CPU+DSP).

It should further be appreciated that the methods, apparatus, and system disclosed herein may have some issues training or detecting graphical objects or card objects that do not have a real-world representation. However, an additional process could be used to transform such an object into image form, and thus be subject to this system. For example, the frequency of prime numbers and their corresponding mathematical attributes could be represented as features within a graphical object, thereby enabling the training and rapid detection of a prime number given that the processed number's attributes are presented in the same form of an image.

Conclusion

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method to generate graphical object classifier data structures comprising:
   identifying graphical objects within an image recorded by a camera;
   for each identified graphical object within the image:
   i) creating a bounding region encompassing the graphical object such that a border of the bounding region is located at a predetermined distance from segments of the graphical object;
   ii) determining pixels within the bounding region that correspond to the graphical object;
   iii) determining an origin of the graphical object based on at least one origin rule;
   iv) determining a text coordinate relative to the origin for each determined pixel; and
   v) determining a statistical probability that features are present within the graphical object, each of the features including at least one pixel having text coordinates; and
   for each graphical object type, combining the statistical probabilities for each of the features of the identified graphical objects into a classifier data structure.

2. The method of claim 1, further comprising:
   determining for each identified graphical object the graphical object type; and
   combining the statistical probabilities for the features of identified graphical objects of the same graphical object type.

3. The method of claim 1, further comprising:
   recording the image with the camera; and
   recording a second image with the camera, the second image being recorded with at least one of a different light intensity, different light frequency, different environmental condition, and different physical marking being applied to a card object that includes the graphical objects.

4. The method of claim 3, further comprising for each identified graphical object within the second image:
   creating a bounding region encompassing the graphical object;
   determining pixels within the bounding region that correspond to the graphical object;
   determining an origin of the graphical object based on at least one rule;
   determining a text coordinate relative to the origin for each determined pixel;
   determining a statistical probability that a feature is present within the graphical object, the feature including at least one pixel having text coordinates; and
   compiling the statistical probabilities for each of the features of the identified graphical objects in the second image with the statistical probabilities for each of the features of the graphical objects of the image into the classifier data structure.

5. The method of claim 1, wherein each of the features includes at least one of a line segment, two line segments connected at an angle, a polygon, and a curved line segment.

6. The method of claim 1, wherein each graphical object type corresponds to a different group of features that have the greatest probability being included within that graphical object type.

7. The method of claim 1, wherein determining that statistical probability that each one of the features is present within the graphical object includes:
   determining a distance between text coordinates of the identified graphical object and the at least one coordinate of the feature; and
   determining the statistical probability based on an average of the distances.

8. The method of claim 1, wherein the at least one origin rule specifies that the origin is applied to a pixel of an identified graphical object that is at a particular position relative to other pixels.

9. The method of claim 1, further comprising transmitting the classifier data structures for each of the graphical object types to a client device thereby enabling a graphical object recognition algorithm to detect graphical objects recorded by a user's client device.

10. The method of claim 9, further comprising:
    recording a image via the client device;
    creating a virtual block over a portion of the image;
    determining that a graphical object is within the virtual block;
    determining pixels within the virtual block corresponding to the graphical object;
    designating one of the determined pixels to be an origin;
    determining a text coordinate relative to the origin for each determined pixel;
    comparing the text coordinates to the classifier data structures; and
    selecting the graphical object type that corresponds the classifier data structure that generates a positive response.

11. The method of claim 10, wherein the positive response includes an indication that the graphical object within the virtual block corresponds to the classifier data structure based on features of the graphical object within the virtual block matching features with a relatively high probability for the classifier data structure.

12. The method of claim 1, wherein the imaged graphical objects are recorded from a non-bounded information source including at least one of a display, a poster, paper and outdoor advertising and identifying graphical objects within the image includes determining a boundary for the imaged graphical objects.

13. The method of claim 1, wherein the imaged graphical objects are recorded from a card object.

14. An apparatus to create graphical object classifier data structures comprising:
   a sample imager configured to record an image of a card object;
   a region identifier configured to identify graphical objects within the image by:
      i) determining pixels that correspond to each graphical object of the image;
      ii) determining a graphical object type of each of the graphical objects;
      iii) creating a bounding region for each of the graphical objects such that a border of the bounding region is located at a predetermined distance from segments of the respective graphical object;
      iv) determining an origin of the graphical object; and
      v) determining a coordinate relative to the origin for each graphical object pixel; and
   a training processor configured to:
      i) determine a statistical probability that features are present within each of the graphical objects, each of the features including at least one pixel having coordinates; and
      ii) for each graphical object type, combine the statistical probabilities for each of the features of the identified graphical objects of that graphical object type into a classifier data structure.

15. The apparatus of claim 14, wherein the training processor is configured to determine a second statistical probability that each one of the features is not present within the graphical object.

16. The apparatus of claim 14, wherein the region identifier is configured to scale the graphical object and bounding region responsive to detecting the graphical object is greater that a first threshold or smaller than a second threshold based on the pixel coordinates.

17. The apparatus of claim 14, wherein the sample imager is configured to receive a physical size of the card object, the region identifier is configured to determine a size of the imaged card object, and the training processor is configured to reference the size of the imaged card object to a size of the bounding regions identified for the imaged card object and the physical size of the card object.

18. The apparatus of claim 14, wherein the graphical object includes at least one of a number, a letter, and a symbol.

19. The apparatus of claim 14, wherein the graphical object includes at least a portion of at least one of a picture, a figure, a logo, and a drawing.

20. The apparatus of claim 14, wherein the classifier data structures are separate XML files.

21. The apparatus of claim 14, wherein the card object is at least one of a credit card, a debit card, a gift card, a pre-paid debit card, a loyalty card, a membership card, a driver's license, an insurance card, a vehicle license plate, a medical card, a prescription card, a club card, an affinity card, a bank check, a business card, and a logo.

22. A machine-accessible device having instructions stored thereon that are configured when executed to cause a machine to at least:
   identify graphical objects within a recorded image of a card object by:
      i) determining pixels that correspond to each graphical object of the image;
      ii) determining a graphical object type of each of the graphical objects;
      iii) creating a bounding region for each of the graphical objects;
      iv) determining an origin of each of the graphical objects; and
      v) determining a coordinate relative to the origin for each graphical object pixel;
   determine a statistical probability that features are present within each of the graphical objects, each of the features including at least one pixel having coordinates; and
   for each graphical object type, combine the statistical probabilities for each of the features of the identified graphical objects of that graphical object type into a classifier data structure.

23. The machine-accessible device of claim 22, further comprising instructions stored thereon that are configured when executed to cause a machine to at:
   record the image prior to identifying the graphical objects with an image; and
   normalize the image in relation to previously recorded images of card objects.

24. The machine-accessible device of claim 23, wherein normalizing includes removing at least one of distortions, noise, shadows, light bursts, skew, and diffusion from the image.

25. The machine-accessible device of claim 23, wherein normalizing includes applying an image transformation to the image including at least one of color adjustment, bit depth adjustment, resolution adjustment, hue adjustment, and saturation adjustment.

26. The machine-accessible device of claim 22, further comprising instructions stored thereon that are configured when executed to cause a machine to at:
   record a negative image of the card object; and
   identify graphical objects within the recorded image of the card object by determining pixels that correspond to each graphical object of the image in conjunction with the determining pixels that correspond to each graphical object of the negative image.

27. The machine-accessible device of claim 22, further comprising instructions stored thereon that are configured when executed to cause a machine to at:
   receive feedback that a graphical object recognition algorithm using the classifier data structures misidentified at least one graphical object of a second card object, the feedback including an image of the second card object, the misidentified graphical object, and a user provided correct graphical object; and
   amending the statistical probabilities of the features for the graphical object type associated with the misidentified graphical object and the graphical object type associated with the user provided correct graphical object based on the feedback.

28. The machine-accessible device of claim 22, further comprising instructions stored thereon that are configured when executed to cause a machine to at determine the graphical object type of each of the graphical objects by determining which features of the identified graphical objects have the greatest probability of being included within a particular graphical object type.

* * * * *